United States Patent [19]
Shelton et al.

[11] Patent Number: 5,848,378
[45] Date of Patent: Dec. 8, 1998

[54] SYSTEM FOR COLLECTING AND PRESENTING REAL-TIME WEATHER INFORMATION ON MULTIPLE MEDIA

[75] Inventors: William Anthony Shelton, Sparks; William R. Healy, Incline Village, both of Nev.; Joseph Francis Earl Jones, El Cerrito, Calif.; Samuel Issac, San Diego, Calif.

[73] Assignee: The International Weather Network, Sparks, Nev.

[21] Appl. No.: 598,185

[22] Filed: Feb. 7, 1996

[51] Int. Cl.$^6$ .................................................. G06F 169/00
[52] U.S. Cl. ........................................................ 702/3
[58] Field of Search ............................................ 364/420

[56] References Cited

U.S. PATENT DOCUMENTS

| | | | |
|---|---|---|---|
| 4,277,845 | 7/1981 | Smith et al. ............................ | 455/505 |
| 4,521,857 | 6/1985 | Reynolds, III . | |
| 4,706,198 | 11/1987 | Thurman . | |
| 5,023,934 | 6/1991 | Wheeless . | |
| 5,105,191 | 4/1992 | Keedy ...................................... | 340/949 |
| 5,390,237 | 2/1995 | Hoffman, Jr. et al. ................... | 379/67 |
| 5,434,565 | 7/1995 | Simon et al. ............................ | 340/949 |
| 5,440,544 | 8/1995 | Zinser, Jr. ................................ | 370/319 |
| 5,517,193 | 5/1996 | Allison et al. ........................... | 364/420 |
| 5,568,385 | 10/1996 | Shelton .................................... | 364/420 |

OTHER PUBLICATIONS

Instruction Book for "Low Level Windshear Alert system (LLWAS) Six Sensor Improvement". Publication No. NSN 0056-00-480-0205, U.S. Dept. of Transportation, Sep. 1, 1993.

Advertising Brochure "Mobile Weather", Weather Metrics, Inc.

Advertising Booklet "City Weather", Weather Metrics, Inc.

Declaration of Russell Coxe.

Declaration of Ed King.

Declaration of Robert Marshall.

*Primary Examiner*—Donald E. McElheny, Jr.
*Attorney, Agent, or Firm*—Townsend and Townsend and Crew LLP

[57] ABSTRACT

A computer-based system for collecting and presenting real-time weather information includes a number of automatic weather detecting stations, a centralized database for storing weather data, and a number of presentation software modules for presenting the data to a number of users over a variety of different media. According to specific embodiments, the system includes a presentation module for presenting real-time data via voice messages to telephone callers, a presentation module for presenting data over a television broadcast, a presentation module for presentation data over a multimedia computer network, and a shared interface and local database module for communicating data to and from the weather database and for maintaining a local database of weather data.

16 Claims, 17 Drawing Sheets

SYSTEM FOR COLLECTING AND PRESENTING REAL-TIME WEATHER INFORMATION ON MULTIPLE MEDIA

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

PAPER APPENDIX

This application has been filed with a paper appendix (comprising Appendix A, B and C) of 463 pages in length containing source code listings of elements of one embodiment of the present invention. This appendix is submitted as part of the application, however Applicants requests that this appendix not be included in printed versions of the patent when issued, but instead be maintained in the application file for public inspection after issuance.

BACKGROUND OF THE INVENTION

The present invention relates generally to weather detection and reporting and more particularly to a computerized system for detecting multiparameter real-time weather information at multiple sites and communicating that information in real-time to multiple end users via a variety of multiple media presentation modules.

A number of systems and strategies exist for the collection of weather data, but none of these systems provide users access to real-time weather data from a variety of sites and none provide different users different presentation modules based on the users needs. Prior art systems have generally required a user to make a separate network or phone connection to each site for which weather data was desired and have often not provided the user with real-time information regarding weather conditions at various sites. Prior art systems have generally been unable to provide sophisticated multifactorial weather information to users via digitized-voice phone connections.

As an example of a prior art system, the National Weather Service maintains a network of radar installations in the United States. Based upon information gleaned from the radar, observers at these stations provide hourly teletyped messages which are disseminated to subscribers. In addition, the National Weather Service employs Weather Bureau Radar Remote (WBRR) equipment designed to provide annotated plan position indicator display at locations remote from the radar sites. Here, a camera scans a high persistency slave display of the radar picture at a slow rate so that the generated information bits can be transmitted over the telephone lines. With this system, it is possible to dial up any one of the remote sites and obtain a transmission of the radar picture information from the remote site. More complete information concerning the National Weather Service system is available in a publication entitled "Introduction to Weather Radar" published in August 1979 by the U.S. Department of Commerce, National Oceanic and Atmospheric Administration.

More detailed weather information can be obtained from the WBRR radar with the National Weather Service Digital Video Integrator and Processor (D-VIP), which automatically processes the output of the radar to produce up to six levels of intensity data corresponding to preselected categories of estimated rainfall rates which, in turn, may be displayed and disseminated as described above.

Improvements on the WBRR system are disclosed in U.S. Pat. No. 4,347,618, "Apparatus For Processing Weather Radar Information," Aug. 31, 1982 to Kavouras et al., where a transmitter adapted to receive radar data from the National Weather Service radar network is used to process the data into a four-range radar image and to append geographical overlay information for transmission over voice-grade phone lines to remote receivers. In the receivers, the data from the phone lines is demodulated and stored into predetermined memory locations corresponding to the four range categories from which the radar data had originally been acquired. Once stored, the individual ranges can be individually selected for display in a six-color format representing the six levels of D-VIP intensity data.

The foregoing systems collect essentially only a single weather parameter, namely precipitation. In addition, there is considerable delay between the time the system commences collecting data, and the time that data is displayed to the end user, therefore the data is not real-time. Furthermore, the systems do not provide a mechanism for a number of relatively nontechnical users to obtain up-to-the-second weather data about sites that those users select.

In U.S. Pat. No. 4,521,857 to Reynolds a system is described for providing weather information to pilots. This system gives information that is limited along a pilot's flight path. Weather information is displayed to a pilot printed out at a terminal prior to the pilot's departure. The Reynolds system does not directly collect any real time weather data, but instead relies on data collected at different points in time and made available by various national weather reporting systems. The system does not include an option for selecting a particular location from which to receive ground-based real-time weather data, but instead provides data along a route as available between two cities. Reynolds provides a system with a singular and limited use, printing out available flight path weather data for pilots.

Other weather data detection and display systems employ multiple weather data sensors including an anemometer, temperature sensor, rain collector, and/or humidity sensor to detect multiple weather parameters. In a basic system, the weather sensors are connected to a display box containing an analog-to-digital converter. The display box receives analog weather data from the weather sensors and displays current numerical readings of the data in digital format. In an expanded system, the display box is coupled to a modem containing dynamic random access memory (RAM). The modem is coupled to a microprocessor based computer programmed to display graphical readings of the data. In this expanded system, incoming weather data is automatically stored in RAM. The system includes sufficient RAM to store approximately 24 hours' worth of data. Once all memory is consumed, new data displaces old data. To collect continuous weather data for multiple days, the operator manually downloads weather data from the modem to the computer hard disk on a daily basis. One supplier of such systems is Davis Instruments Corp. of Hayward, Calif.

While all of these systems provided some weather data to remote users, none of these systems allowed users to interactively select to receive weather data from multiple different sites over one connection and none of these systems allowed different presentation modules to access the same weather data for presentation over different media.

What is needed is a flexible weather data collection and presentation system that provides real-time weather data from multiple sites and that allows a number of different presentation modules to share the collected real-time data so that costs and effort of collecting real-time data can be taken advantage of by a number of different types of users.

SUMMARY OF THE INVENTION

The present invention is a computerized system for collecting real-time weather data at a centralized database and making that data available to different users through a variety of different presentation modules. Data presentation modules include, but are not limited to, a module for interactively presenting real-time weather data via a telephone, a module for interactively presenting real-time weather data via a multimedia computer presentation, possibly over a network protocol such as the World-Wide-Web (WWW), and a module for interactively presenting real-time weather data via a television broadcast hosted by a weather presenter. The present invention allows collected real-time weather data to be shared among a number of different types of users, each having different requirements.

According to the present invention, a number of weather stations are located at areas where it is desired to collect real-time weather data. Each weather station normally includes some or all of the following instruments for sensing different weather parameters and the like: thermometer, humidity gauge, barometer, anemometer, rain gauge, water temperature sensor, snow depth gauge, cloud scanner, earthquake sensor, video camera. Each weather station will normally include one or more analog to digital converters to convert the normally analog signals from the weather sensors into digital signals for transmission and storage.

Associated with each weather station is a station base computer for that station. A weather station may be connected directly to its base computer or it may be positioned at a location remote from its base computer and may communicate with its base computer via voice-quality telephone lines, either a permanently open telephone line or a dial-up line, or via other known or to-be-developed communication media such as a wide-area-network like the Internet. Data is stored on a continual real-time basis for the entire period during which communication from the base computer to the remote weather station occurs.

The weather station base computer communicates via the Internet or some other communication means to a database herein referred to as the WEATHERSERVER(TM) database. According to the invention, collected weather data at the WEATHERSERVER database may be simultaneously made available to a variety of different users via a variety of presentation modules through use of a data interfacing program described in more detail below. The collected weather data may be made available to a professional weather presenter or directly to viewers via a broadcast or cable television system through an module such as the WEATHERMAN(TM) presentation system which is described in coassigned and copending U.S. patent application Ser. No. 08/251,983, now U.S. Pat. No. 5,568,385. At the same time, the WEATHERSERVER database may be made available to individuals via voice telephones using a touch-tone menu system that provides the real-time data via a recorded or simulated voice over a phone line. At the same time, the data may be available over a computer network such as the World Wide Web via a server designed to present the data in an appropriate format for that network. This format may include graphical data, text, sound or other multimedia format. The separation of the weather data collection functions and the information presentation functions provides a major advantage to the invention in that the equipment and expenses of collecting the weather data can be shared among a large number of potential users of the information, with different users having different needs.

The weather station base computers, the voice telephone presentation module, and the television presentation module all communicate with the WEATHERSERVER database via a software interface and local database module herein referred to as the WEATHERCENTER(TM) module. The WEATHERCENTER module maintains local copies of data needed by the presentation modules, can accept data from up to eight or more remote weather stations and transmit that data to a WEATHERSERVER database, and formats all requests for data to the WEATHERSERVER from its associated presentation module. A system according to the invention will have several operative instances of the WEATHERCENTER module distributed throughout the system.

The system includes the ability to collect numerical data, textual data, graphs, and pictures; to superimpose the numerical, textual and graphical data on said pictures; and to communicate the superimposed image to end users. In this case, pictures can be stored images or real-time images being collected with a video camera at the same time as the weather data is being collected. In this fashion, the system is capable of providing end users with high information content weather images, for example, temperature, rainfall, windspeed and barometric data (in alphanumeric and/or graphical expression) superimposed upon a satellite picture of the region in question, or some other picture of interest (e.g., real-time or taped video of the rain falling; wind blowing snow, rain or trees; snow drifts; snow control teams in action; hurricanes; tornados; earthquakes; etc.)

An advantage of the present invention is thus that it can collect weather data from multiple weather parameters at multiple weather stations; communicate that data to a central processor; automatically process that data into predetermined graphic informational subsets and predetermined voice synthesized informational subsets; and communicate graphic information and voice information to end users, all in real-time. A further advantage is that the present invention can communicate such graphic information to end users via a variety of techniques including television broadcast, coaxial cable, network server, or multiple source video units. Still another advantage is that extremely high information content images can be collected and communicated to end users in real time from multiple weather sites.

Another advantage is that because the WEATHERCENTER (TM) is programmed to operate in a windows-based (or similar) software environment, multiple executable files (or processes) can be running simultaneously on the base computer. In practice, this means that WEATHERCENTER along with WEATHERMAN can be used in a live television weather broadcast where the broadcast can be switched from screen to screen without interruption, where each screen is the output of a separate real-time windows process. Thus, the broadcast can display sequential real-time weather data screens from different weather sites around the viewing area. For example, a weather broadcast in Reno could show—in rapid, real-time sequence—weather data such as temperature, rainfall, snowfall and windspeed—from Reno, Incline Village, Donner Pass, Mount Rose, and Lake Tahoe. Because each of these sites has a unique weather system, real-time weather data from such sites are important to many persons in the Reno viewing area including motorists, skiers, windsurfers, hikers, fishermen, and persons engaging in various other endeavors.

DESCRIPTION OF THE PREFERRED EMBODIMENT

Real-time Weather Collection and Presentation System

Figure 1:
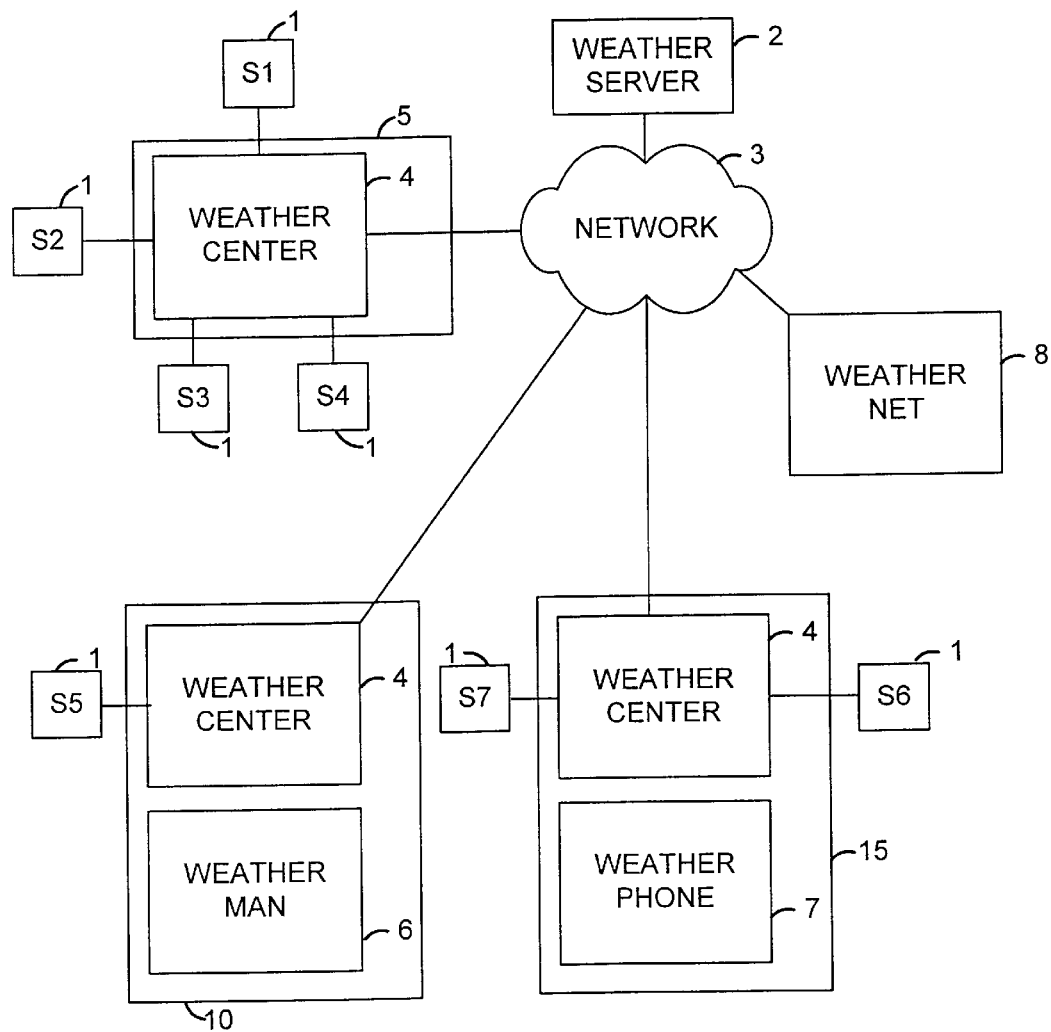
FIG. 1 is a diagram of a real-time weather data collecting and presentation system according to an embodiment of the present invention.

FIG. 1 is a schematic diagram of a computer-based multistation weather data collecting and reporting system according to the present invention. As shown in FIG. 1, the system includes a number of remote WEATHER STATIONS 1 (S1–S7), a data base server 2, herein referred to as WEATHERSERVER(TM), software communication and interface modules 4 herein referred to as WEATHERCENTER(TM) modules, and weather presentation modules, 6, 7, and 8. Computers 5, 10, and 15 are indicated as containing certain of the software modules as will be explained is greater detail below.

Real-time weather data is transmitted from WEATHER STATIONS 1 via their associated WEATHERCENTERs 4 to the WEATHERSERVER 2 over a network 3, which may be any type of communications network and in one specific embodiment is the worldwide Internet. WEATHERSERVER 2 continuously accepts asynchronous transmissions of weather data from WEATHER STATIONS 1 via their associated WEATHERCENTER modules 4 and continuously updates a database it maintains. WEATHERSERVER 2 responds to requests for weather data from any WEATHERCENTERs 4 or other authorized users on the network by retrieving the requested data, including real-time data, from its database and transmitting it on network 3 to the WEATHERCENTER 4 that requested it.

Also shown in FIG. 1 are a number of real-time weather data presentation drivers including a telephone presentation driver 7 herein referred to as WEATHERPHONE(TM) allowing multiple users to access weather data via a phone line. Using touch-tone signals, telephone users may specify the remote stations from which they wish to receive weather data. The data including the real-time weather conditions at the selected site is presented to the users as a series of automatically generated voice messages. Shown in FIG. 1 is also a network server presentation driver 8 hereinafter referred to as WEATHERNET(TM) allowing multiple users to access the weather data at the base computer via a computer client/server network interconnection. Using any one of a number of standard client/server network interfaces (such as HTTP, Microsoft Network, or any other network client/server protocol), network client users may specify from which of the remote stations they wish to receive weather data. The data including the real-time weather conditions at the selected site is presented to the users in a variety of formats that are supported by the particular client/server protocol being used. In an HTTP client/server setting, data is presented as text, graphical representations, satellite, radar, and photographic images, and may be presented as video or audio. Also shown in FIG. 1 is a meteorologist presentation driver 6 hereinafter referred to as WEATHERMAN(TM). This driver is designed to facilitate the presentation of weather data from the remote locations by a weather reporter during a live television broadcast. Many details of this presentation system were discussed in the coassigned U. S. patent application referred to above and incorporated herein by reference. The driver includes signal processing equipment that converts data to broadcast-ready status, by converting VGA images into a genlocked, NTSC video source, whereupon the processed signal may be sent to a television broadcast transmitter and, ultimately, broadcast to the public. Drivers 6,7, and 8 are examples of types of drivers that may be employed in a weather system according to the invention, but it will be understood that other types of drivers may be used to present weather data from database 2 for other purposes.

WEATHERCENTER Module

Figure 2:
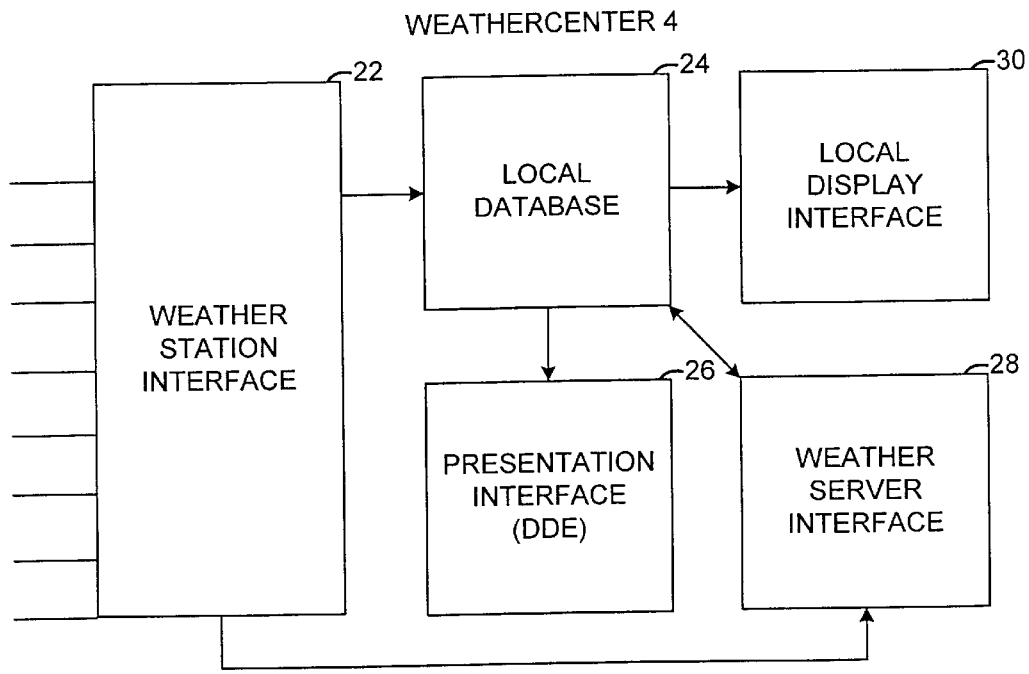
FIG. 2 is a schematic diagram of a WEATHERCENTER component of the system illustrated in FIG. 1.

FIG. 2 is a block diagram illustrating the chief components of a WEATHERCENTER module 4 according to the invention. Included in the WEATHERCENTER module 4 is a weather station interface 22, a local database 24 for storing local weather data, a presentation server 26 for responding to requests for real-time data from a presentation module, and a server database interface 28 for communicating with WEATHERSERVER. A WEATHERCENTER module 4 may also contain a local display driver 30 for allowing a local operator using standard computer input and display devices such as a keyboard, mouse, and VDT, to examine the local operation of the WEATHERCENTER and to set certain WEATHERCENTER parameters.

The WEATHERCENTER modules 4 provide three functions according to the invention. First, a WEATHERCENTER module running on a base computer such as 5, is responsible for collecting weather data from a number of remote weather stations such as S1–S4 and storing that data locally. To accomplish this the WEATHERCENTER module includes the ability to read data from the weather stations and compile that data as needed into local history tables. For weather stations that are local to the WEATHERCENTER computer, the data is received via a serial port of the computer. The data is split up into its individual components of temperature, humidity, wind speed, direction, rain, etc. The data is then processed to determine if any of the statistical variables need to be updated.

For weather stations that are remote and do not have their own copy of WEATHERCENTER running, the user of WEATHERCENTER configures the system with the phone number and station ID of the remote system. WEATHERCENTER can be configured to automatically dial the remote station upon start up and keep the station online, dial the station at an interval set by the user or the connection can be manually initiated. Once the connection has been made the data is handled the same way that a locally connected weather station is handled.

For remote weather stations running WEATHERCENTER, the protocol and communications is very similar to a weather station with a modem. The one difference is that the remote WEATHERCENTER will also provide statistical information so that the local WEATHERCENTER does not have to stay connected full time to track statistical information. Once connected the remote WEATHERCENTER sends the current statistics (valid up to the current time of transmission) and then sends the current condition data until the connection is shut down. The current condition data is handled the same way that a locally connect weather station is handled.

WEATHERCENTER maintains statistical information on weather conditions for the weather stations that it is monitoring. This information may include:

1. High and Low indoor temperatures for day, week, month and year
2. High and Low outdoor temperatures for day, week, month and year
3. High and Low indoor humidity for day, week, month and year
4. High and Low outdoor humidity for day, week, month and year
5. Highest wind gust, date, time and direction for day, week, month and year
6. Total rainfall for day, week, month and year
7. Total snowfall for day, week, month and year WEATHERCENTER can maintain a database of current weather conditions stored at a configured interval for use by WEATHERMAN, WEATHERPHONE or any program capable of handling a Microsoft Access Database.

A second function of the WEATHERCENTER modules is to transmit data from the Weather Stations to the WEATHERSERVER database 2 via network 3. WEATHERCENTERs thus provide a standard interface throughout the system. WEATHERCENTERs initiate transfers of data to WEATHERSERVER 2, thus allowing WEATHERSERVER to passively receive remote weather data without having to poll or maintain communication with numerous remote WEATHER STATION sites.

A third function of the WEATHERCENTER modules is to accept requests for data from their attached weather presenting modules, such as 6 and 7, and make the requested data available. WEATHERCENTER accomplishes this by both maintaining a local WEATHERCENTER database of weather data collected by that WEATHERCENTER and by transmitting requests to WEATHERSERVER 2 for data not collected locally. This local database is a generally a subset of the data found in the WEATHERSERVER 2 and may, for example, contain data only relevant to a particular number of cities. The WEATHERCENTER modules 4 independently maintain a current local database by issuing queries to the WEATHERSERVER 2 for needed data. Then, as that data is requested by a presentation module, such as 7, the data is locally available.

According to the invention, a WEATHERCENTER module associated with a particular presentation driver, such as that located on computer 10, may also be attached locally to one or more WEATHER STATIONS, such as S5. In this case, the WEATHERCENTER module does not need to retrieve weather data regarding S5 from the WEATHERSERVER 2, the WEATHERCENTER module merely stores the data in its local database before then transmitting that data to the WEATHERSERVER.

The WEATHERSERVER allows data to be received from weather stations from anywhere in the world. To receive data from it, the WEATHERCENTER computer needs to be connected to a network that can handle TCP/IP traffic and is in some way connected to the Internet. During configuration of WEATHERCENTER, the TCP/IP address of the WEATHERSERVER is set. When a WEATHERCENTER site is opened that will be receiving its information from the WEATHERSERVER, the first thing that happens is that WEATHERCENTER requests a current list of sites available from the server. The user than selects a site from the list and WEATHERCENTER then starts continuously requesting weather data from the server. WEATHERCENTER connects to the WEATHERSERVER and tells it how many sites of data its requesting and sends a list of site IDs. WEATHERSERVER then sends the data for all of the sites requested that are available. The data is then split into individual components and it is then processed the same way as the other collection methods.

The WEATHERCENTER Server Communication Procedure is as follows:

Upon the first connection with WEATHERSERVER, WEATHERCENTER
1) Requests a list of currently active sites;
2) User can select sites to display;
3) User selected sites are then stored by WEATHERCENTER for future Data Requests.

All subsequent connections are as follows:
1) If WEATHERCENTER is transmitting information to the WEATHERSERVER, WEATHERCENTER gathers all the necessary information and keeps a count of the number of sites transmitted;
2) WEATHERCENTER then gathers a list of all sites it is requesting data for and keeps a count of the number of sites requested;
3) WEATHERCENTER transmits this information to the WEATHERSERVER for processing;
4) If any site information was requested by the WEATHERCENTER, WEATHERSERVER gathers the information for each site requested and transmits it to the WEATHERCENTER;
5) WEATHERCENTER unpacks the information and processes it as specified earlier.

WEATHERCENTER can interact with presentation modules in one of two ways. Local shared files in local database 24 are continuously updated by WEATHERCENTER and contain the current conditions as well as the statistical information such as highs and lows described previously. These files may then be independently accessed by a presentation module, such as WEATHERPHONE, without further direct interaction by WEATHERCENTER. WEATHERCENTER can also use Microsoft's Dynamic Data Exchange to continuously update any program that establishes a DDE link with it with current and statistical weather information.

WEATHERCENTER can receive calls via modem from other WEATHERCENTER programs. When a connection is established WEATHERCENTER sends the current statistical information and then sends the current weather data continuously until the connection is shut down.

If WEATHERCENTER is configured to connect to the WEATHERSERVER over a TCP/IP network, it will continuously update it with weather data that it has collected both locally and remotely. WEATHERCENTER will connect to the server, tell it how many weather sites of data its sending and then follows that with the weather data.

The statistical information maintained by WEATHERCENTER is tracked by comparing each data sample taken against the currently stored statistical values which are stored in local database 24. If the any current value exceeds, either higher or lower, the corresponding ongoing statistical value, that value is updated with the current information.

WEATHERCENTER Module With Weather Stations

Figure 3:
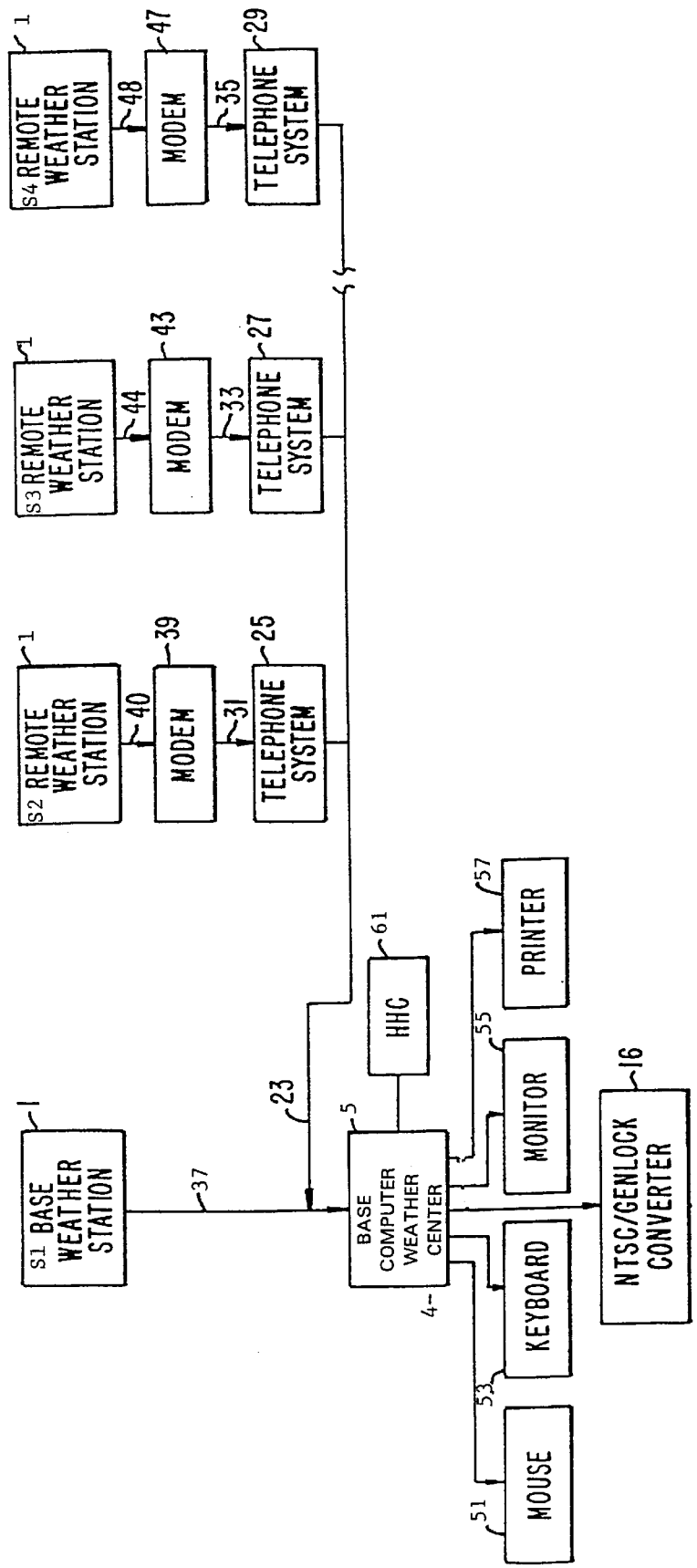
FIG. 3 is a schematic diagram of a weather station base computer with associated weather stations according to an embodiment of the invention.

FIG. 3 is a schematic diagram of a station base computer such as 5 running the WEATHERCENTER software according to the present invention. Each weather station 1 includes a number of different weather-sensing instruments. As will be explained in greater detail with reference to FIG. 4, the weather-sensing instruments included in each weather station can detect a variety of different weather parameters such as rainfall, temperature, barometric pressure, humidity, windspeed, and the like. The weather stations need not have the same weather instruments, and normally different combinations of instruments will be used at different weather stations. For example, the weather station at a mountain top might include, among other things, an instrument to measure snow depth, but have no need for an instrument to detect water temperature. Conversely, a weather station located at a sea-level lake might have no need for an instrument to measure snow depth, but might include, among other things, an instrument to measure water temperature. Each weather station generates a stream of data signals 37, 40, 44, 48 containing the weather data collected from each weather instrument at a particular instant in time.

Base computer 5 is generally physically located near one or more of the weather stations or at a site where real-time weather data will be made available to users, as explained below. Weather stations 1 may be positioned at locations either near or remote from base computer 5. Nearby weather stations may communicate with base computer 5 via coaxial cable or other direct hookup such as 37, while remote weather stations normally must communicate with the base computer 5 by other means such as via modems 39, 43, 47 and telephone lines 25, 27, 29. The signals received at the base computer 5 from Remote Weather Stations is accepted via a transceiver (not shown) at the base computer 5 before joining the signal 37 from Base Weather Station 1 for processing by the base computer. The digital signal from each weather station is sent along a particular communication medium chosen by the user.

The base computer 5 may be provided with conventional peripheral I/O devices, including a mouse 51, keyboard 53, monitor 55 and printer 57. In addition, the computer 5 may be provided with a hand held controller (HHC) 61 which combines the necessary functions of the mouse and keyboard into a single hand-held unit, coupled to the computer directly by a cable or indirectly by infrared wireless hookup.

Base computer 5 is programmed with the WEATHER-CENTER windows-based software to collect digital weather data signals 37, 23 from the weather stations 1, to determine which weather station each signal is from, to decode the encoded digital weather information from each weather instrument at each weather station 1, to automatically manipulate that data into multiple informational subsets or files for display in graphic format, and to send that data to a remote centralized database over the Internet. The base computer 5 may run multiple files simultaneously, with one or all or some intermediate portion of the multiple files displayed simultaneously on the monitor 55 with each file allocated to a separate portion of the screen, while the remaining files run in the background, ready to be instantaneously called to the foreground for viewing. Each file consists of some subset of the weather information collected by the computer, e.g., one file might contain the rainfall, temperature and windspeed at Donner Pass in the Sierra Mountains; and another file might contain the rainfall, temperature, windspeed, humidity and water temperature of a location 40 miles away at Lake Tahoe in Tahoe City, Calif.

Weather Stations

Figure 4:
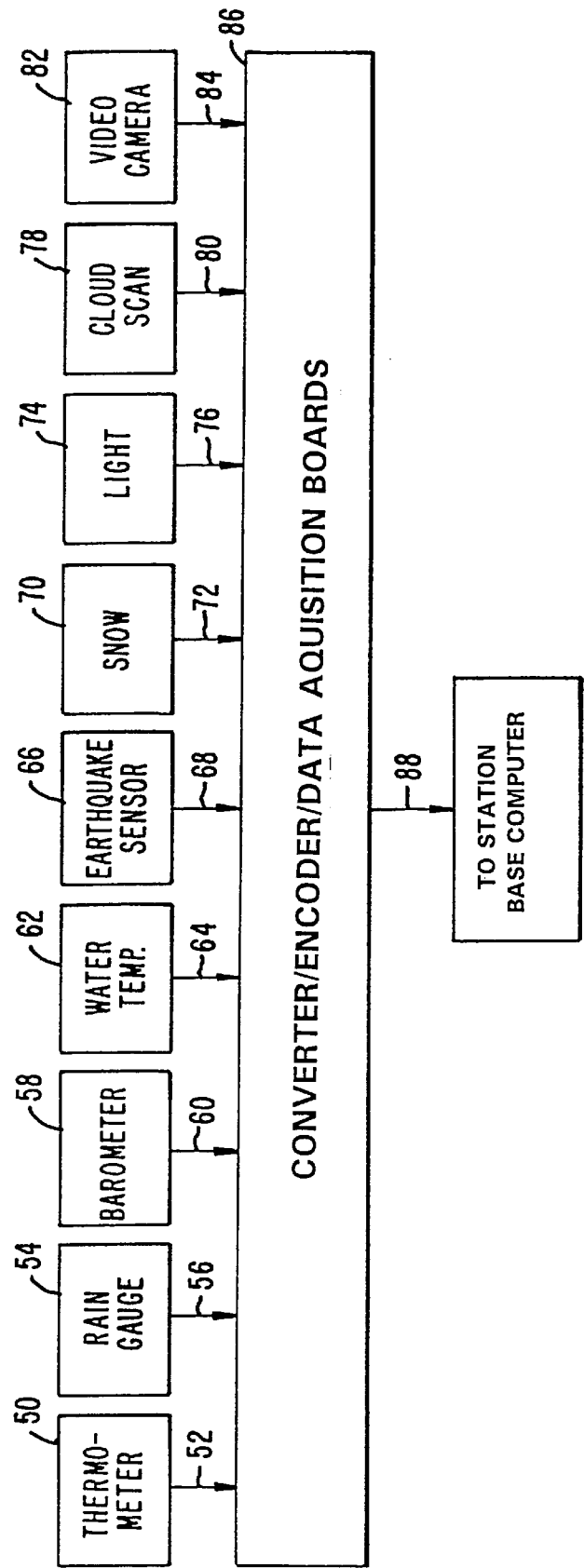
FIG. 4 is a weather station of the type shown in FIG. 3, illustrating various weather sensing instruments suited for use in such a weather station.

FIG. 4 illustrates various weather-sensing instruments suited for use in weather stations such as S1–6. A weather station is comprised of a series of different weather-sensing instruments such as a thermometer 50, rain gauge 54, barometer 58, water temperature gauge 62, earthquake sensor 66, snow depth gauge 70, light meter 74, cloud scanner 78, and video camera 82. Each weather instrument is electronic, i.e., it is designed to generate an electrical signal that varies in an analog fashion according to variations in the weather parameter being sensed by the instrument. Thus, for example, the thermometer 50 generates a relatively low voltage electrical signal 52 when the ambient temperature is 40 degrees Fahrenheit, and a relatively higher voltage signal 52 when the temperature is 50 degrees Fahrenheit. The analog electrical signals 52, 56, 60, 64, 68, 72, 76, 80, 84 from each of the weather instruments 50, 54, 58, 62, 66, 70, 74, 78, 82, respectively, each represent a particular value of each weather parameter measured by the instruments.

The analog signals 52, 56, 60, 64, 68, 72, 76, 80, 84 go to converter/encoder 86 which converts each analog signal to a parallel digital signal, converts each parallel digital signal to a corresponding serial digital signal, and then encodes all such serial digital signals corresponding to the weather data collected at that weather station at a particular instant into a single serial digital signal 88. For example, an encoded serial digital signal 88 is a fixed-length string of 18 bytes. The first byte is a header; the next two bytes are water temperature; the next two bytes are ambient air temperature; the next byte is windspeed; the next two bytes are wind direction; the next two bytes are barometric pressure; the next byte is humidity; the next byte is light level; the next four bytes are rainfall; the last two bytes are the check to be sure the string came across properly. Thus, the position of each byte within the string indicates the specific weather parameter to which that byte corresponds. If the weather station is sampling at the rate of one reading every minute, then the first 18 byte string corresponds to the data collected by all instruments at minute one, the next 18 bytes corresponds to the data collected by all instruments at minute two, and so forth.

The output signal 88 of the converter/encoder 86 is sent to the base computer via coaxial cable (as signal 37 of FIG. 3), via modem/telephone communications system (as signal 23 of FIG. 3), or by any other suitable means of communication.

A simplified form of weather station of the type shown in FIG. 3 may be purchased from Davis Instruments Corp. of Hayward, Calif., which offers Weather Monitor II (TM) display box, Weatherlink (TM) modem and software. The Davis system is designed to work with an anemometer, external temperature sensor, external temperature/humidity sensor, and rain collector. The Davis display box takes analog signals from the instruments, converts the analog signals to parallel digital signals, stores the digital signals, displays the digital signals with a digital readout device, calculates the wind chill factor from external temperature and windspeed data, records the time and magnitude of peak wind gusts, and records the time and magnitude of high and low temperature. The Davis modem stores up to 24 hours of data in RAM and converts the parallel digital signal to an encoded serial digital signal of the type described above for transmission to the serial port of a base computer. A base computer is programmed with the Davis software, which must then be manually instructed to download weather data from the modem RAM. Unlike the present invention, the Davis system is not designed to run multiple weather stations from a base computer, nor is the base computer programmed to run multiple screens simultaneously or multiple sites on the same screen at the same time. Nonetheless, the Davis weather station can be modified to be used in the present invention.

WEATHERMAN

FIG. 1 shows a WEATHERMAN module 6 connected via a WEATHERCENTER 4 to network 3 for retrieving data from database 2. The WEATHERMAN module provides much of the functionality of the weather presentation system discussed in co-assigned patent application Ser. No. 08/251,983, now U.S. Pat. No. 5,568,385 with an improvement being that the WEATHERMAN module is connected to a WEATHERCENTER that has access to real-time weather data from the database 2. According to one embodiment, the WEATHERMAN module 6 is a windows software application running on a windows capable computer system alongside a WEATHERCENTER module. WEATHERMAN retrieves all data via communications with the WEATHERCENTER module.

A source code listing for an embodiment of the WEATHERCENTER interface module is attached as Appendix A. This appendix has omitted some specific data formatting information that is not necessary to an understanding of the invention.

WEATHERPHONE

Real-time weather data from database 2 is made available to users over a touch-tone telephone via WEATHERPHONE module 7 communication through a WEATHERCENTER module 4. WEATHERPHONE makes available in real-time to telephone users the same data that is available to professional weather reporters via WEATHERMAN 6 and that is available to computer users via WEATHERNET 8.

In a system including WEATHERPHONE, users are able to select and hear information stored at the WEATHERCENTER local database system via a telephone link wherein users may select data using a touch-tone or voice-recognition menu system and users hear real-time weather data via a message builder using either prerecorded or synthesized voice to transmit the data.

Figure 5:
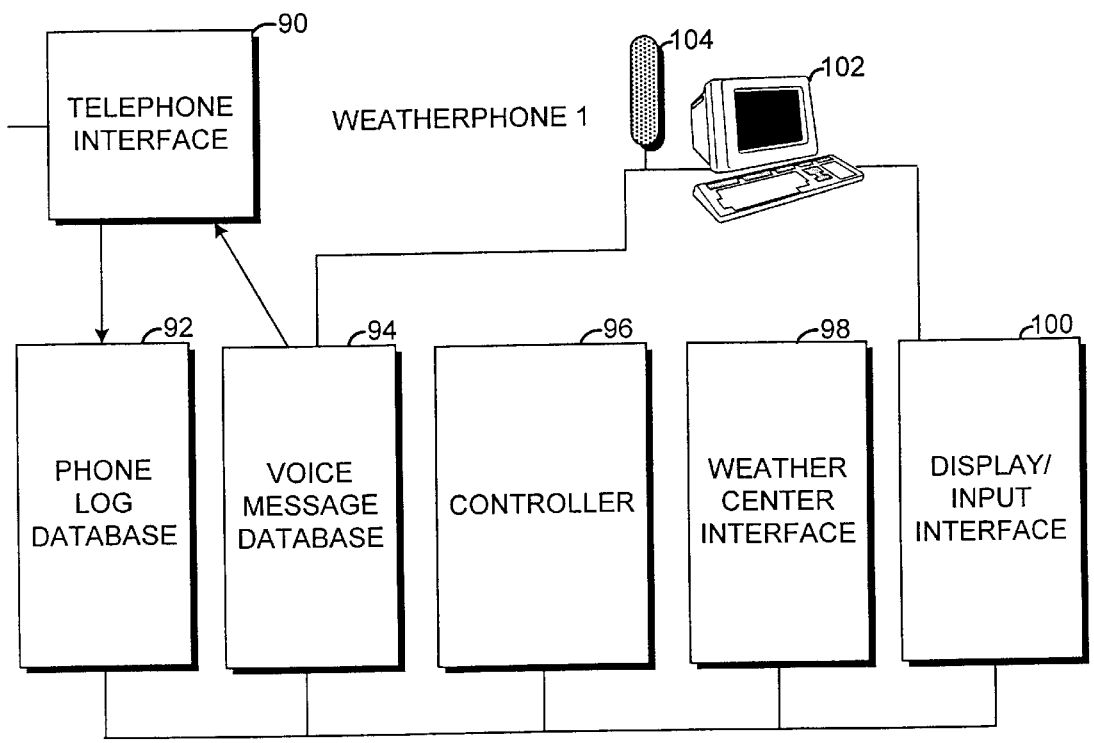
FIG. 5 is a schematic diagram of a WEATHERPHONE module according to an embodiment of the invention.

The WEATHERPHONE module 7 according to one embodiment is illustrated in FIG. 5. The WEATHERPHONE module includes a telephone interface 90 for handling user phone calls, a phone log database 92 for logging user phone calls, a voice message database 94 for storing prerecorded voice messages, a controller 96, a WEATHERCENTER interface 98, and a screen display/input driver 100 for allowing a manager to configure the data that is accessible by the telephone system and to examine the activities of the telephone system. The WEATHERPHONE system will usually be running on a computer such as 15 which has associated with it a display and input device 102 and a microphone 104. The microphone 104 allows a manager to input voice messages into database 94. One embodiment of the present invention is shown wherein WEATHERPHONE is associated exclusively with a WEATHERCENTER module connected to a WEATHERSERVER, but it will be understood that the WEATHERPHONE module could be used with other local databases as well.

Figure 6A:
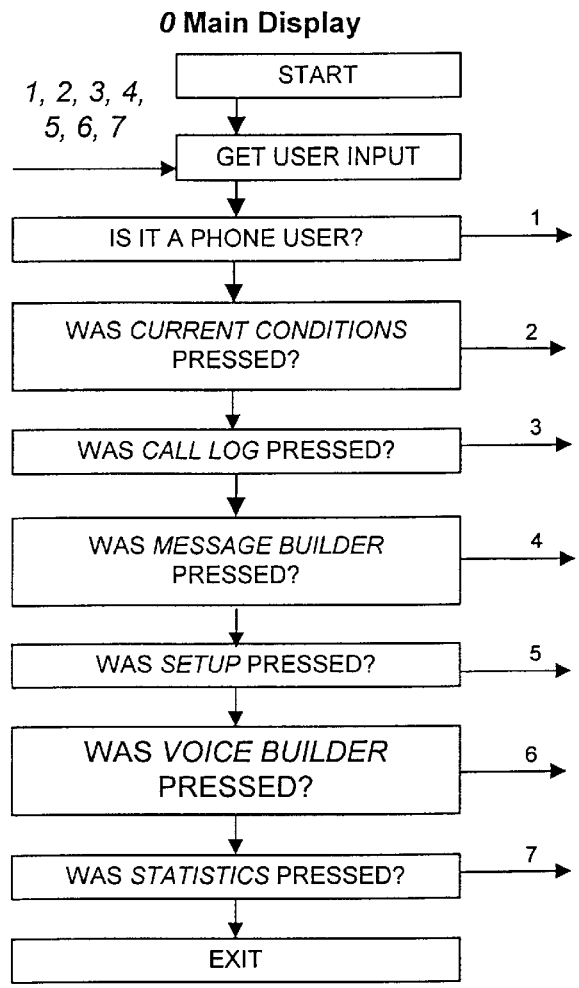
FIGS. 6A to 6I are flow charts of the operation of a WEATHERPHONE module according to an embodiment of the invention.
Figure 6C:
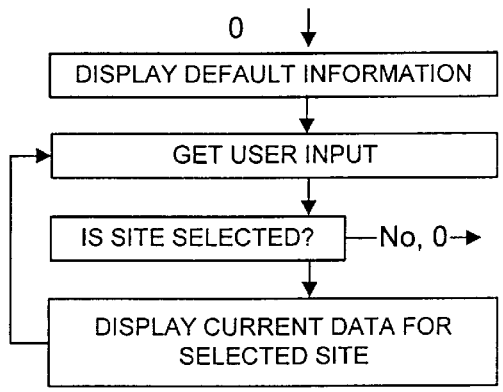
Figure 6B:
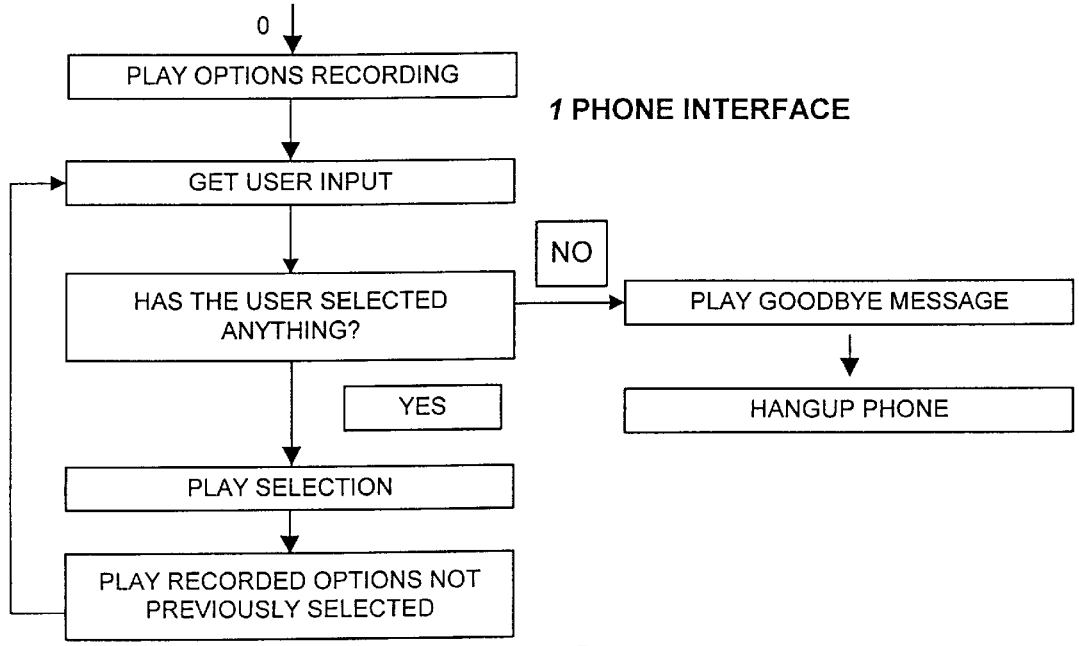
Figure 6D:
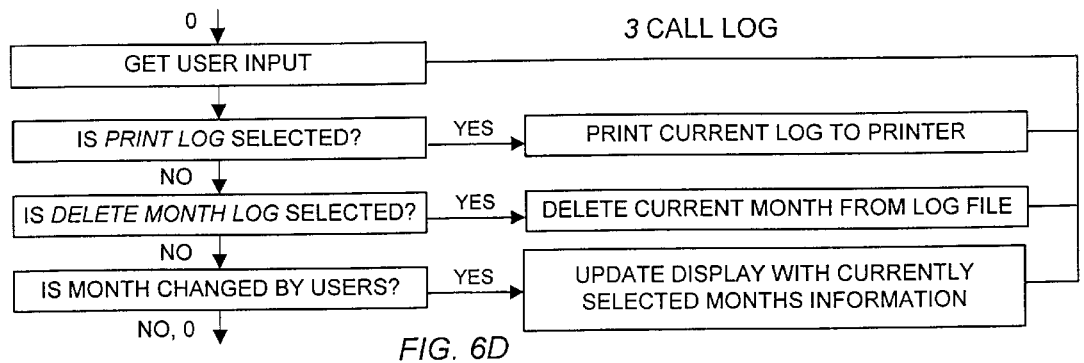
Figure 6E:
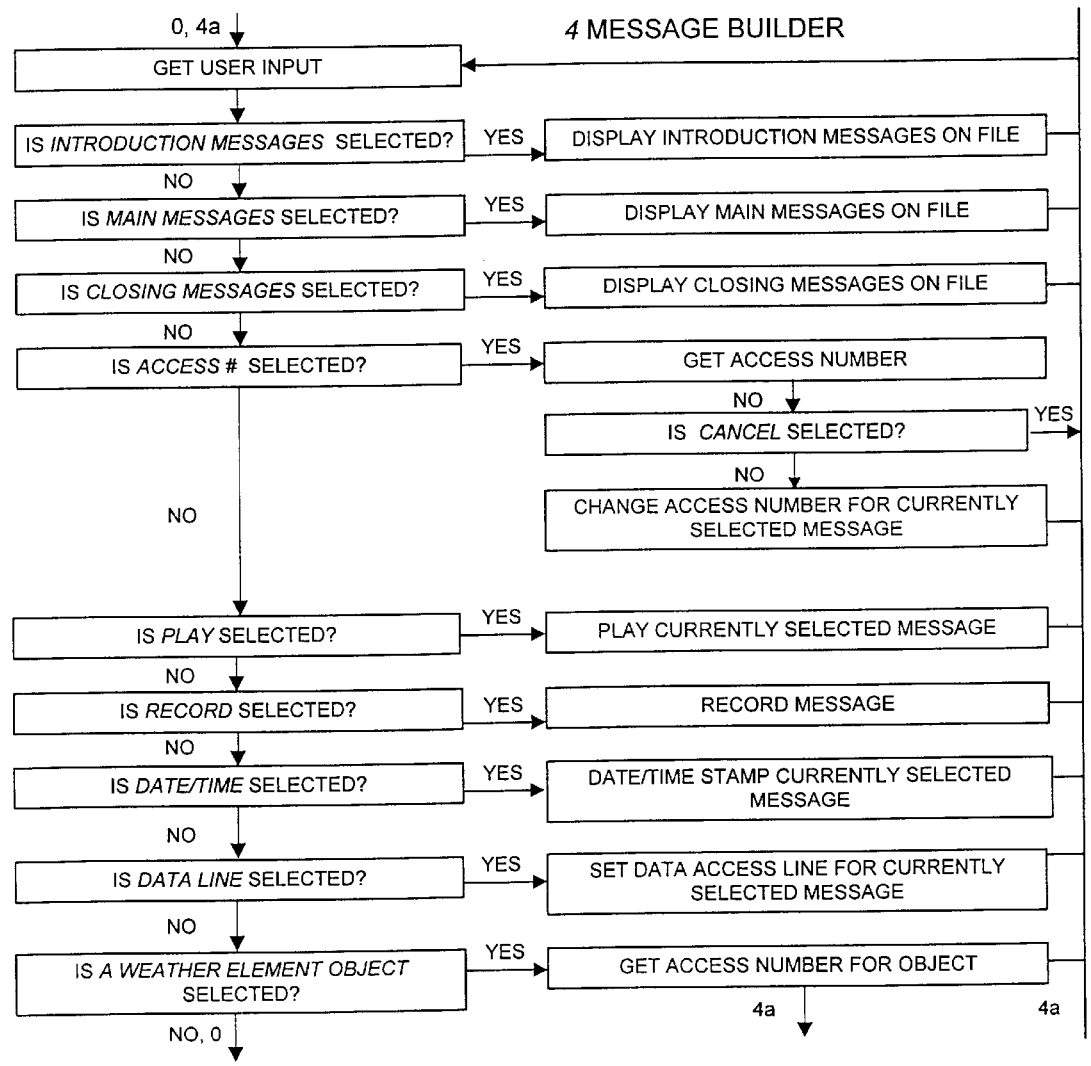
Figure 6F:
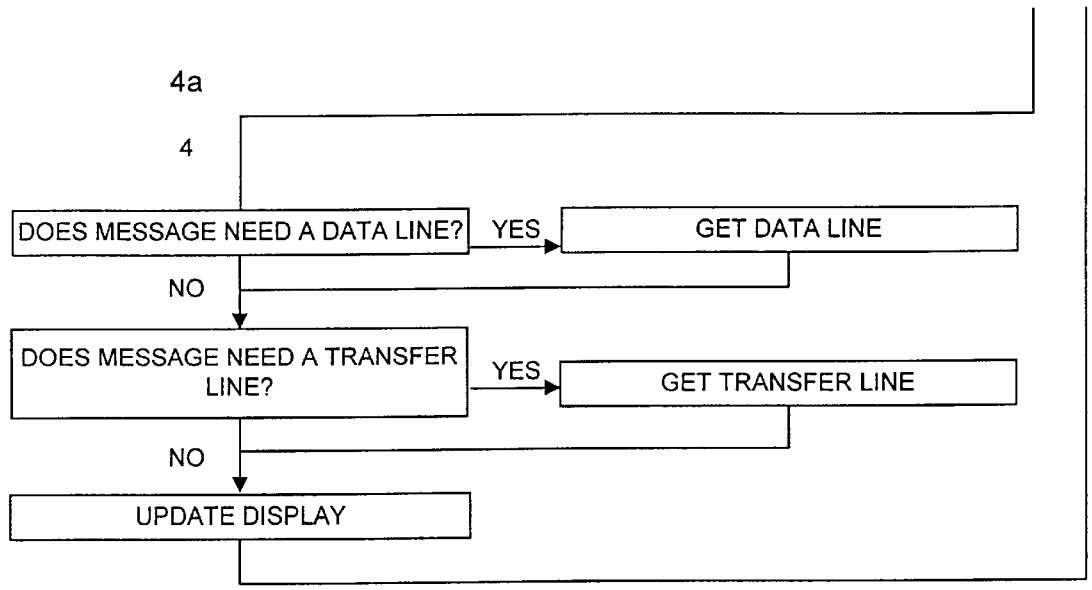
Figure 6G:
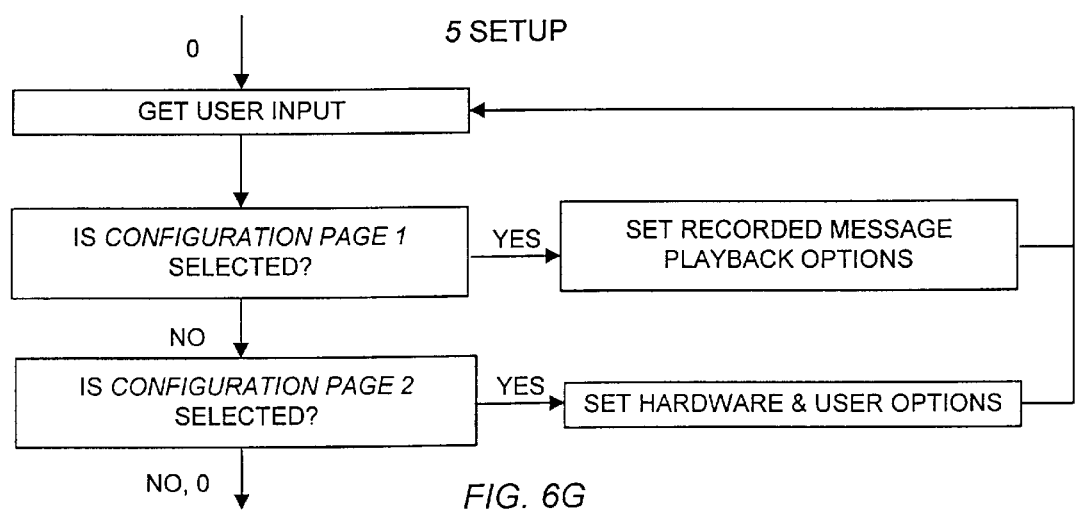
Figure 6H:
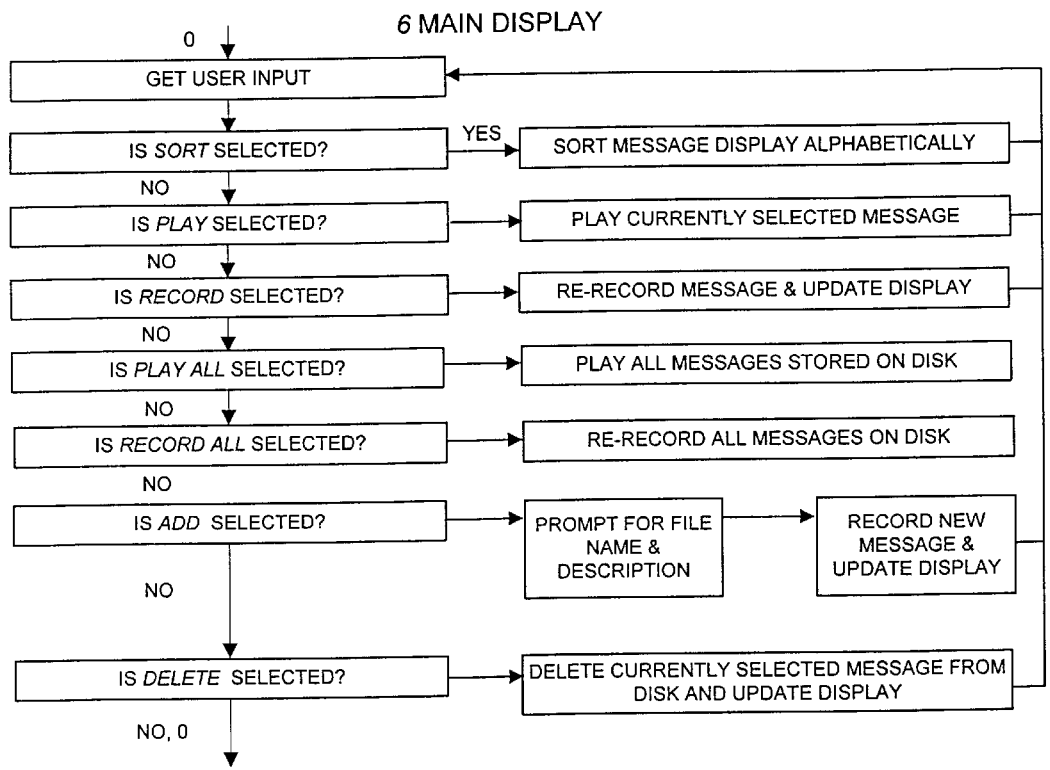
Figure 6I:
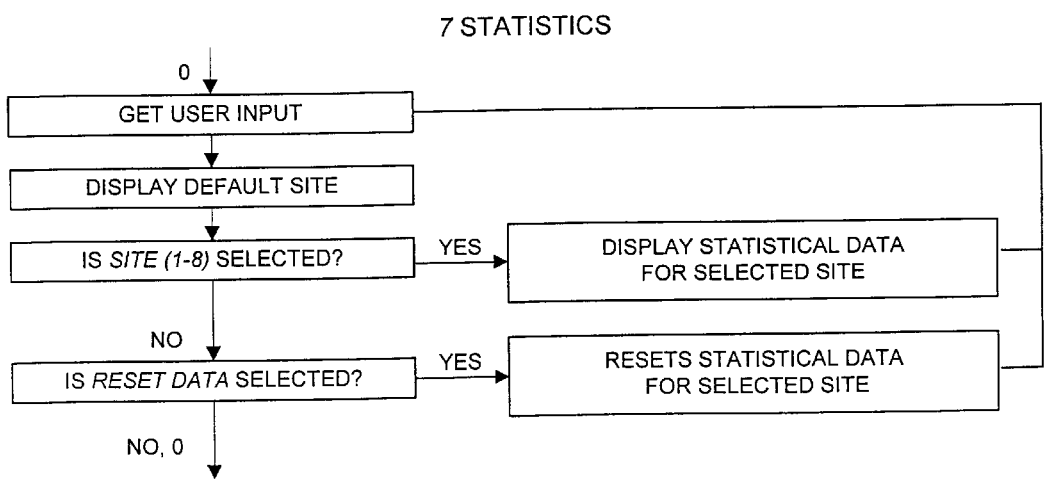

FIGS. 6A–6I are a flow chart illustrating the operations of WEATHERPHONE module 7. As shown in FIG. 6A, the module includes phone user option for interactively presenting real-time weather data via voice messages to a phone user, a Current Conditions option for displaying on workstation 102 the current weather conditions at a selected site as those conditions would be reported via voice to a user selecting that site; a Call Log Function for examining call activity as stored in database 92; a Message Builder function for configuring voice messages that will be presented to a caller; a Setup function for setting certain initial parameters; a Voice Builder function for managing voice messages; and a Statistics function for displaying certain statistics of the system. FIGS. 6B–6I show further details.

Figure 7A:
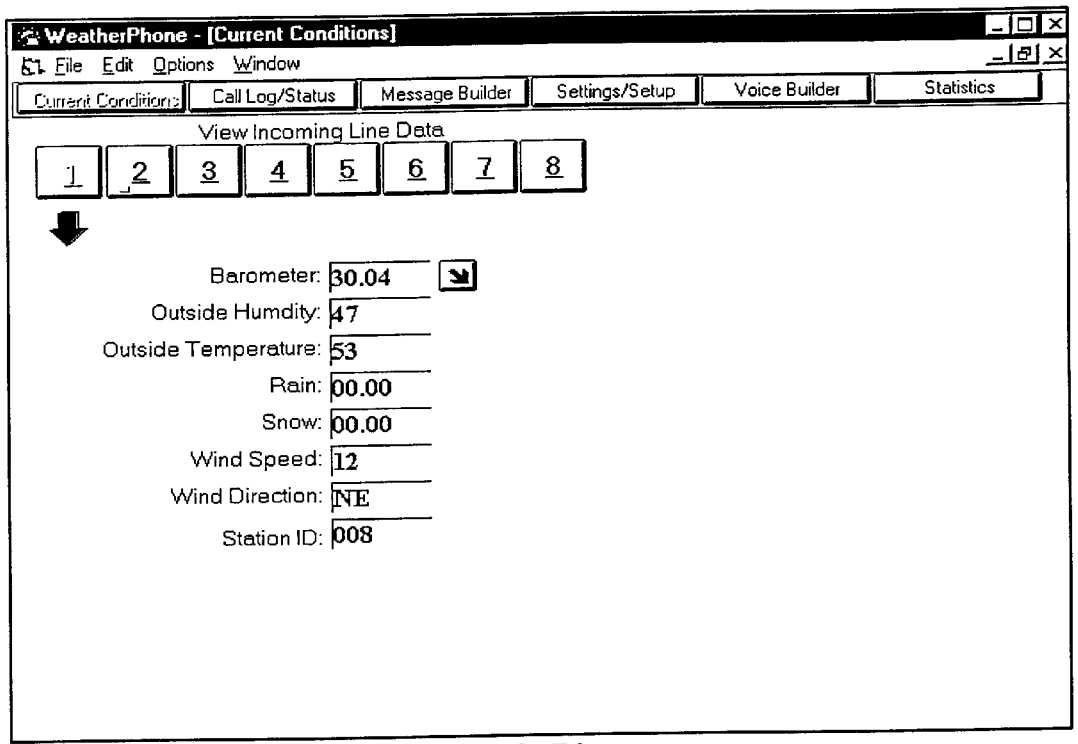
FIGS. 7A to 7Q are illustrations of screen outputs of the operation of a WEATHERPHONE module according to an embodiment of the invention.
Figure 7B:
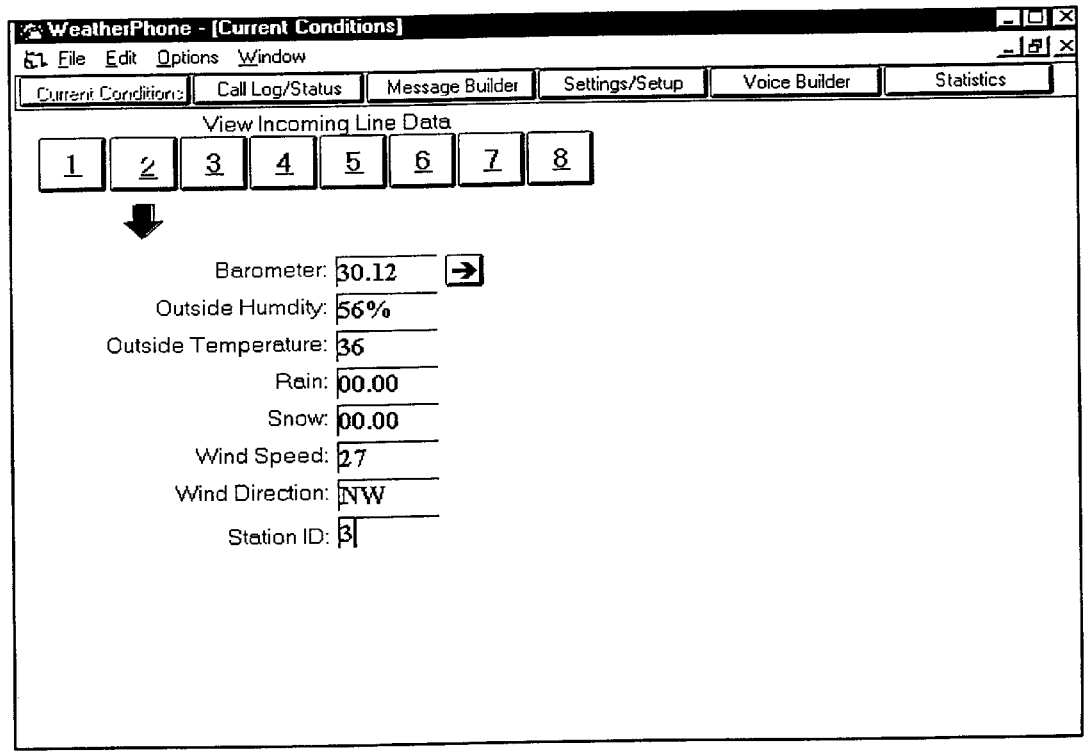
Figure 7C:
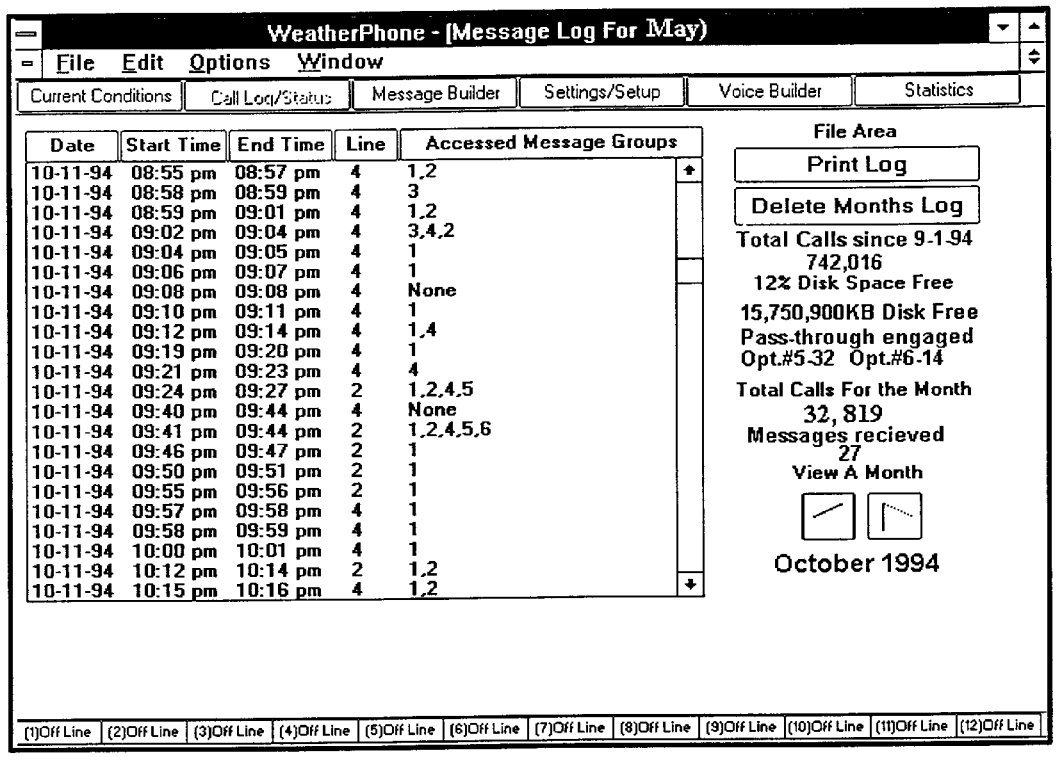
Figure 7D:
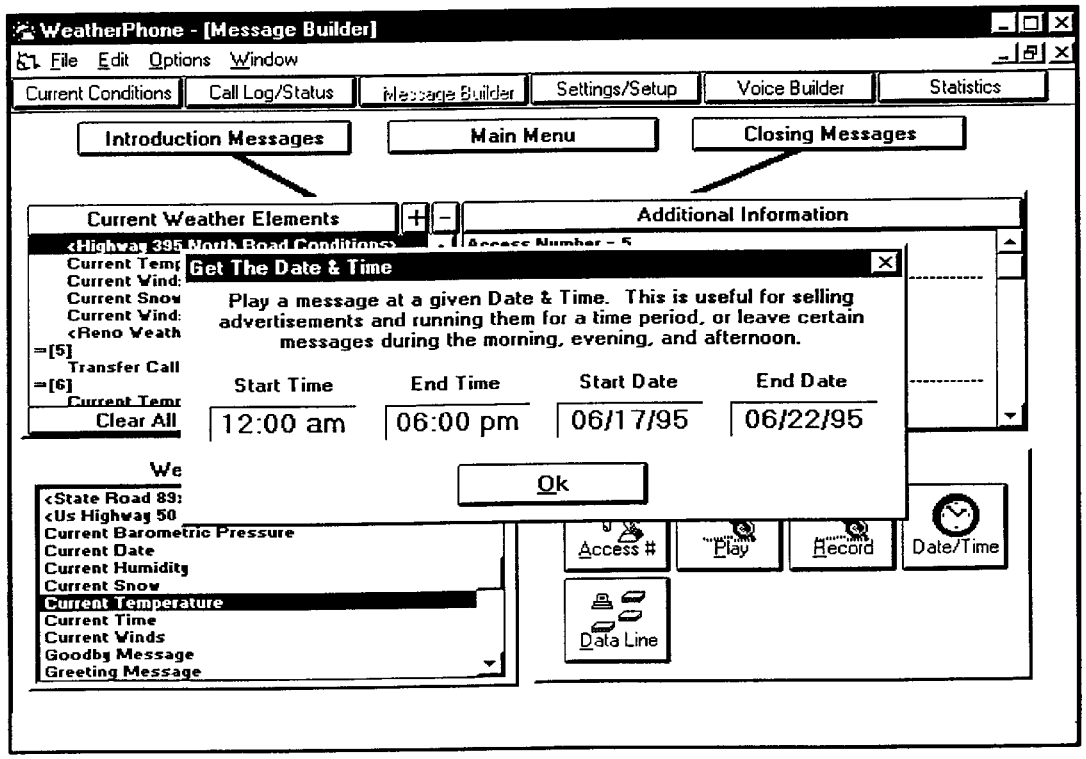
Figure 7E:
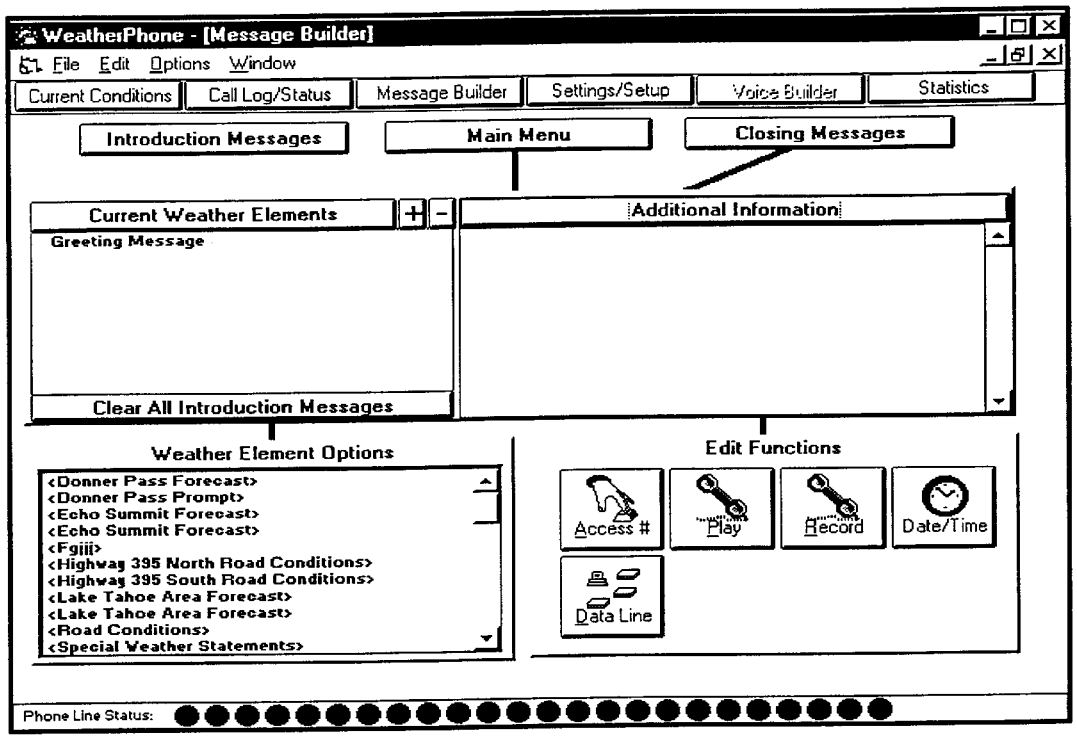
Figure 7F:
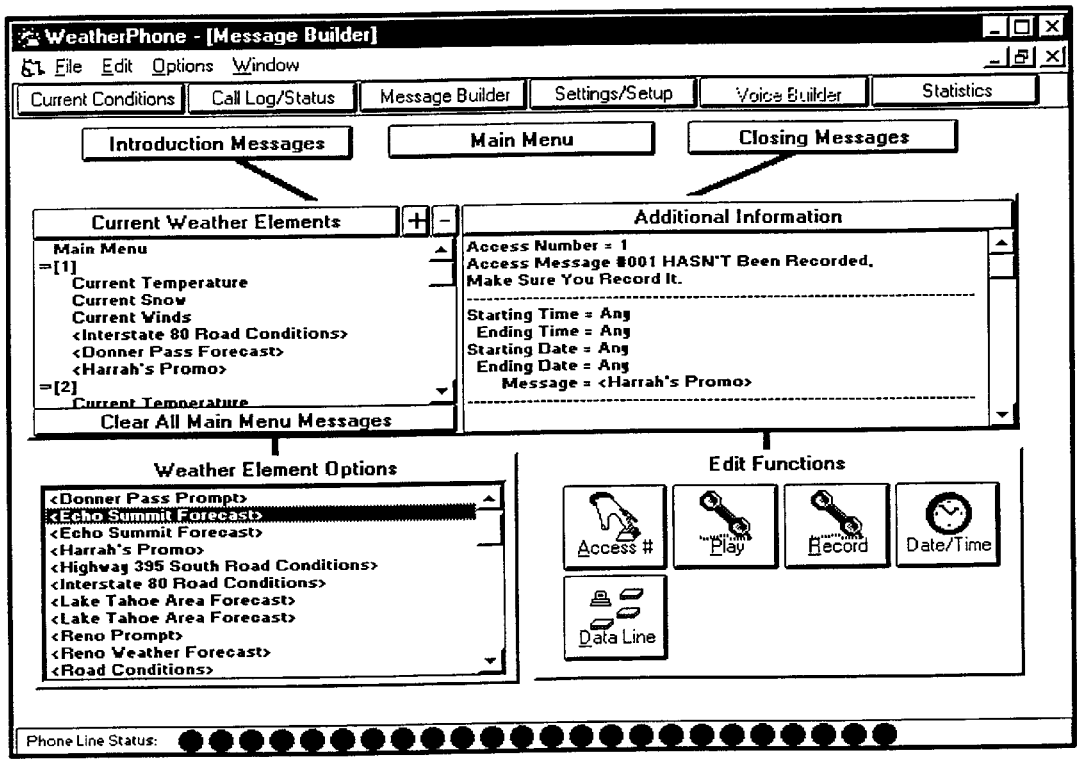
Figure 7G:
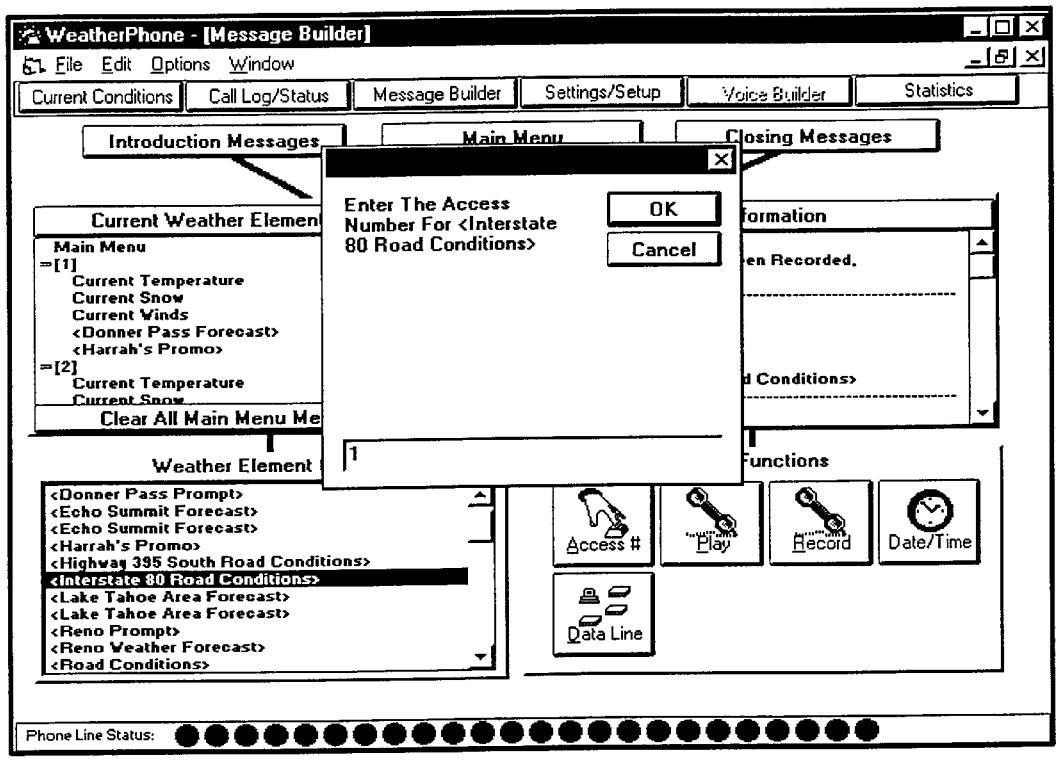
Figure 7H:
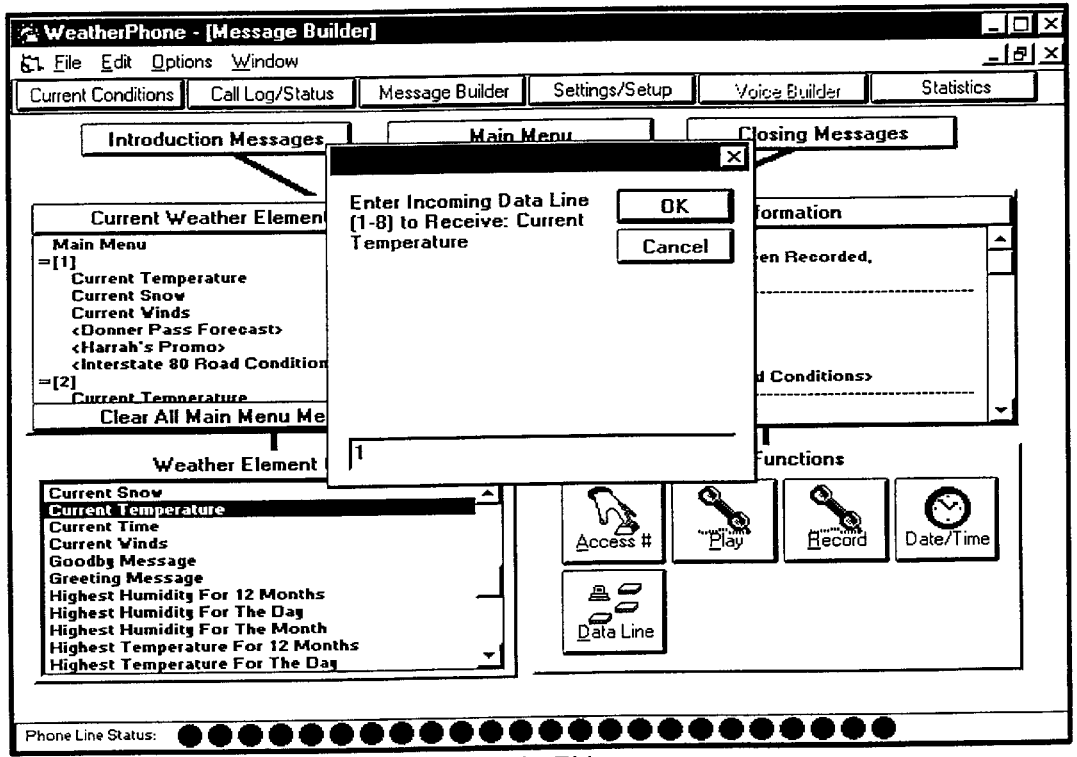
Figure 7I:
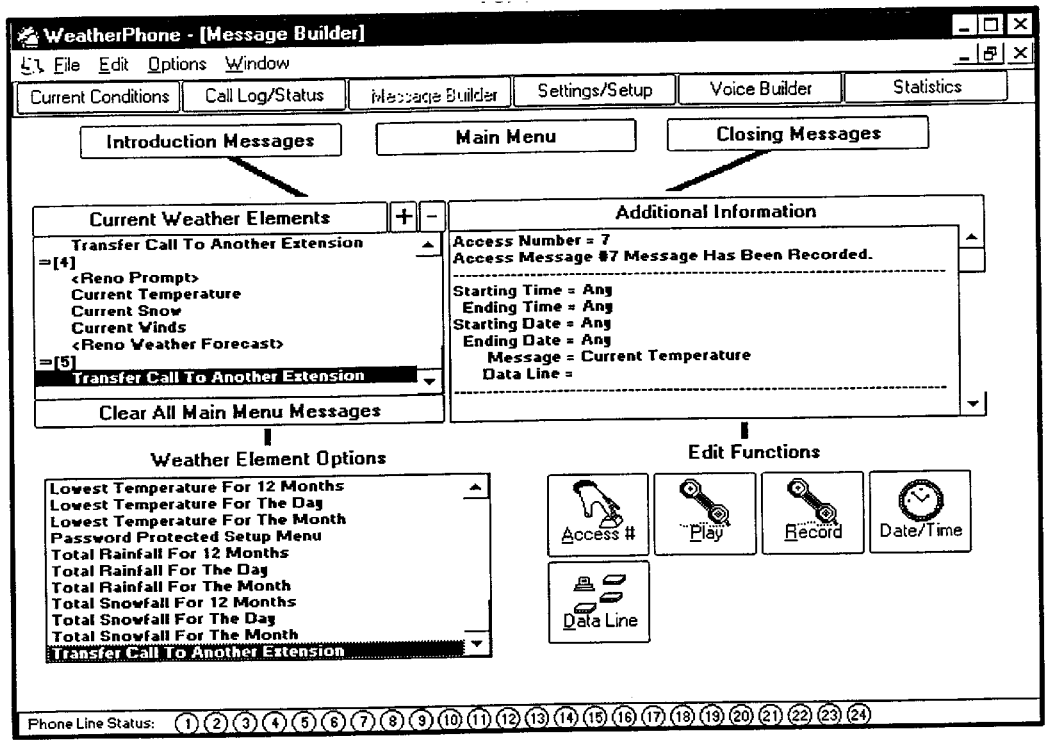
Figure 7J:
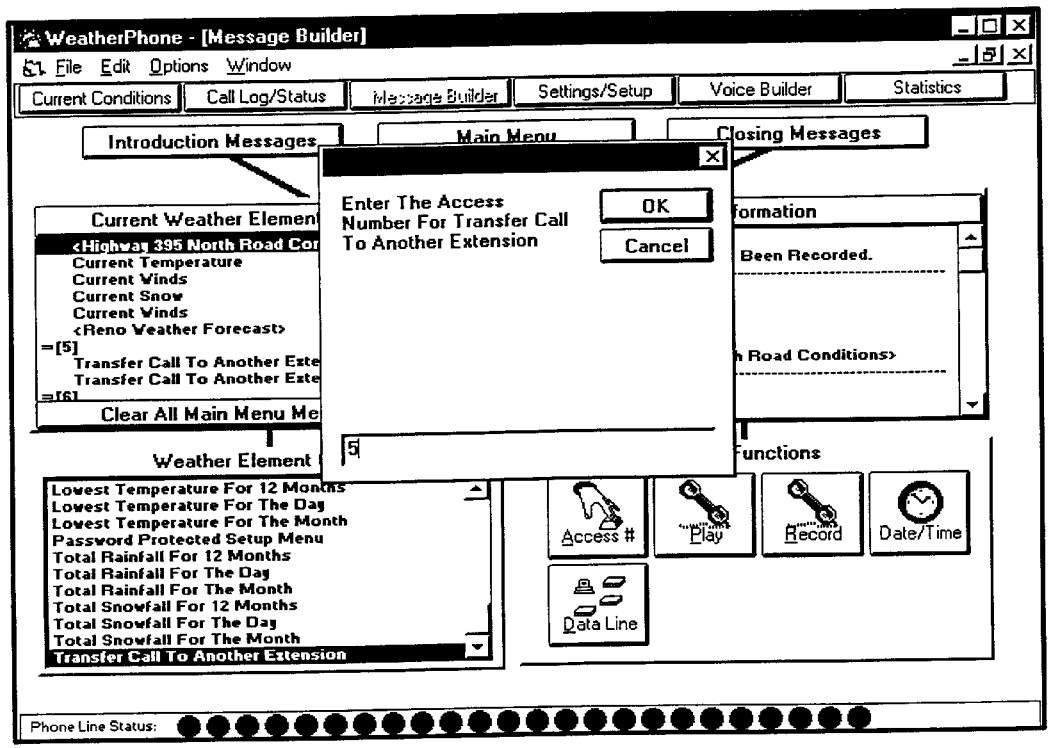
Figure 7K:
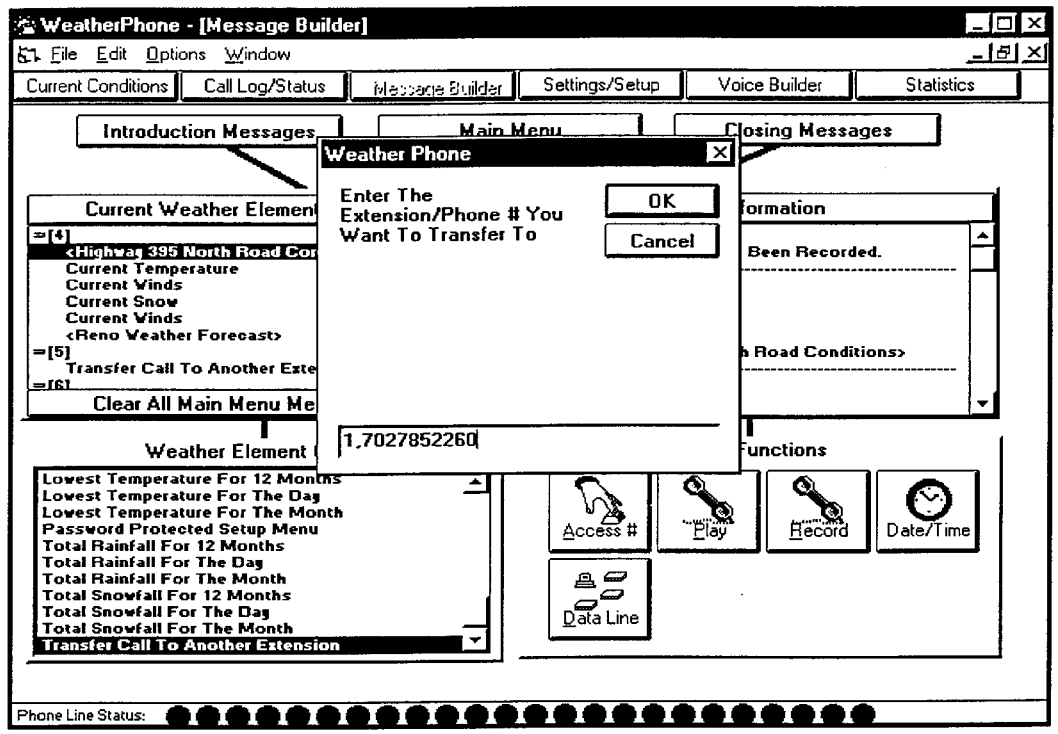
Figure 7L:
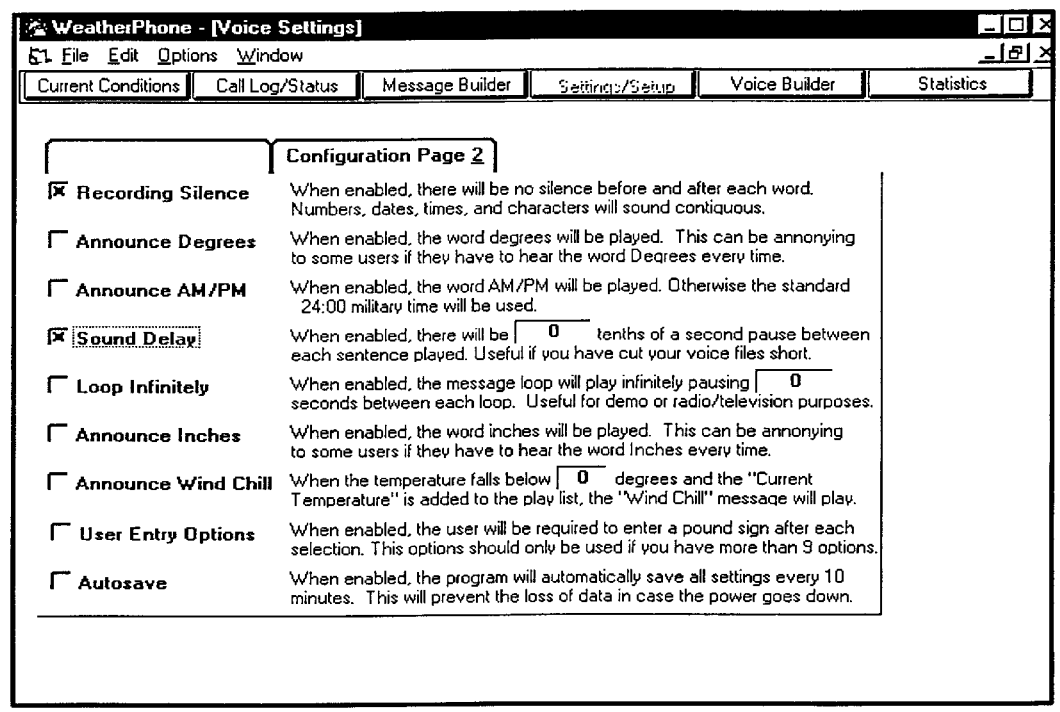
Figure 7M:
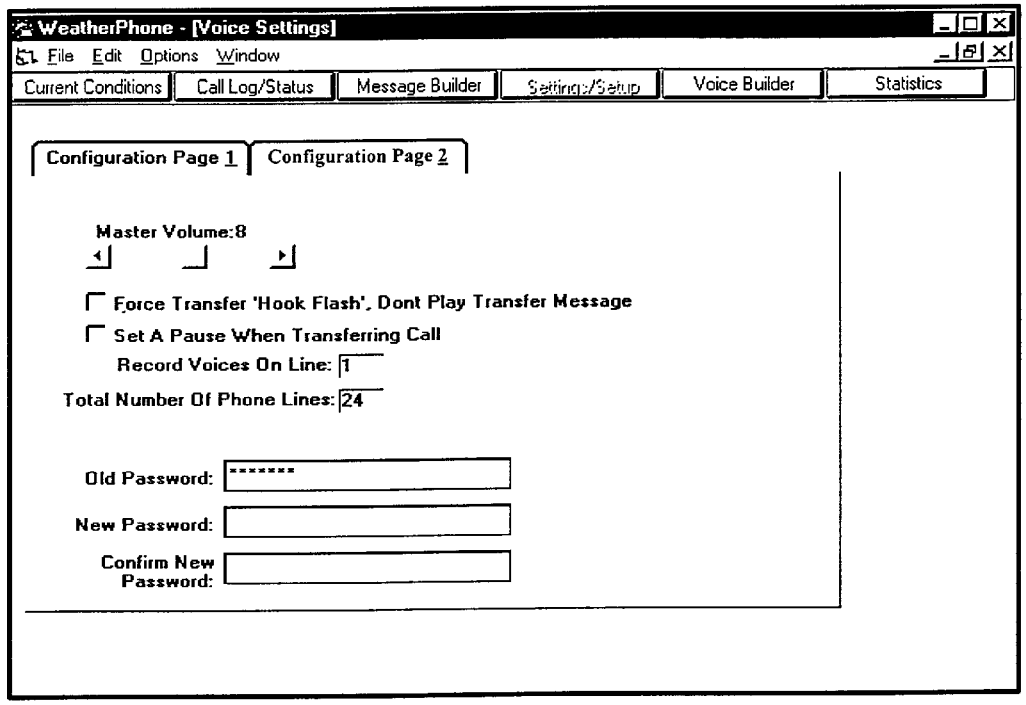
Figure 7N:
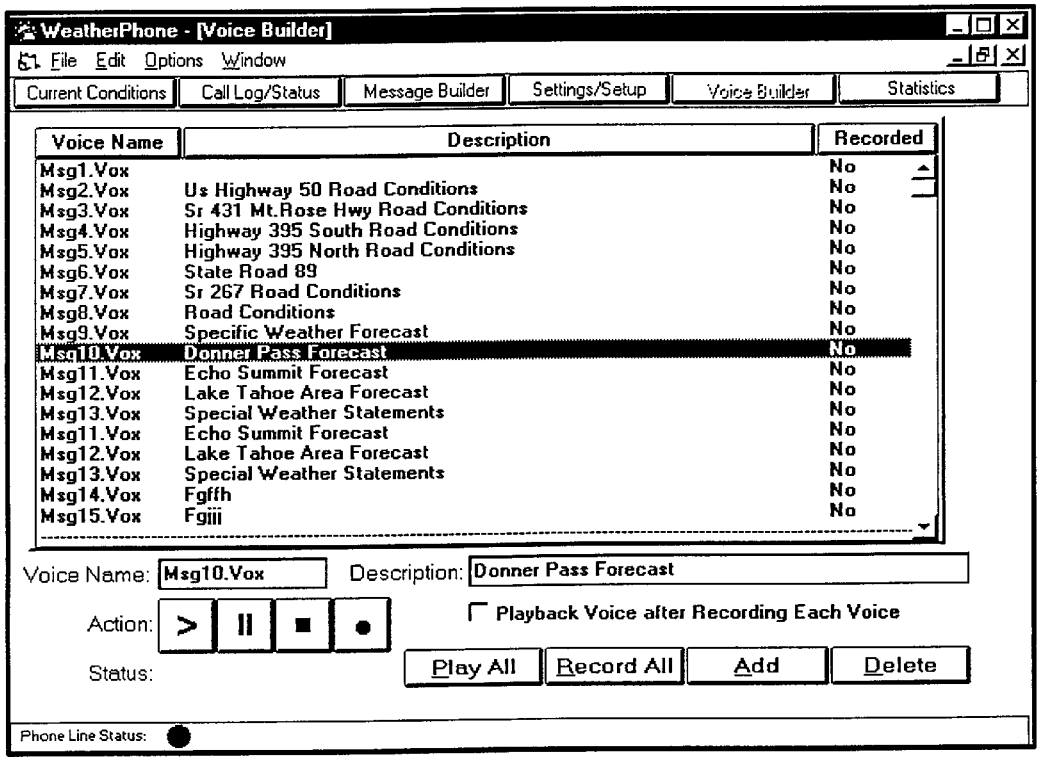
Figure 7O:
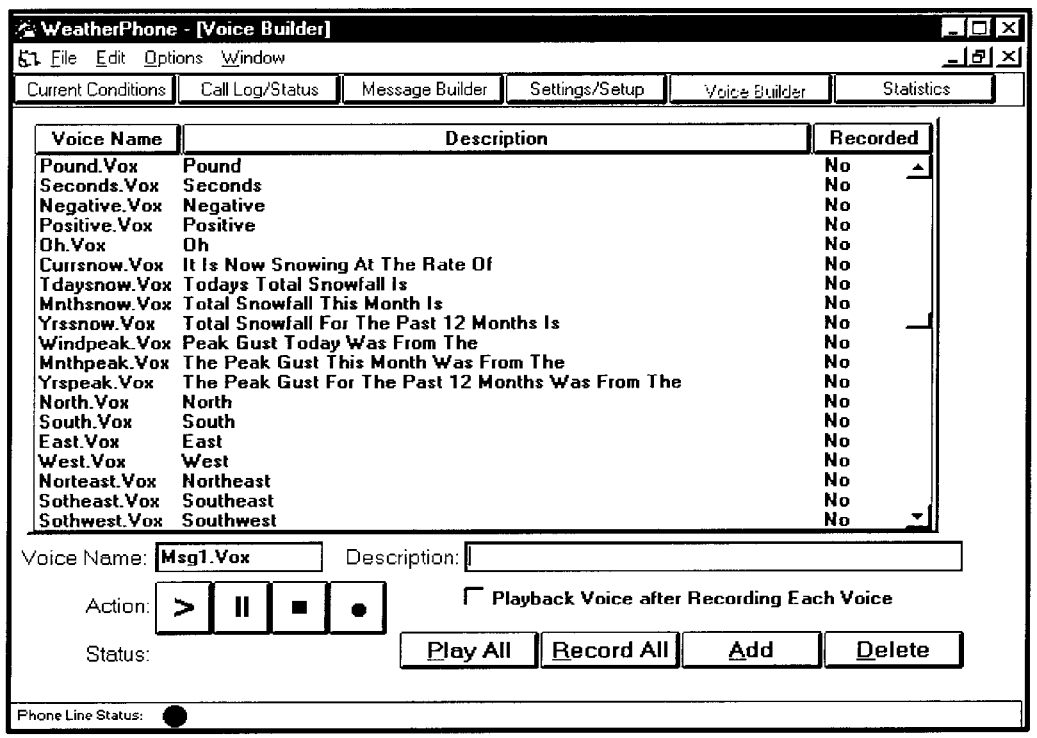
Figure 7P:
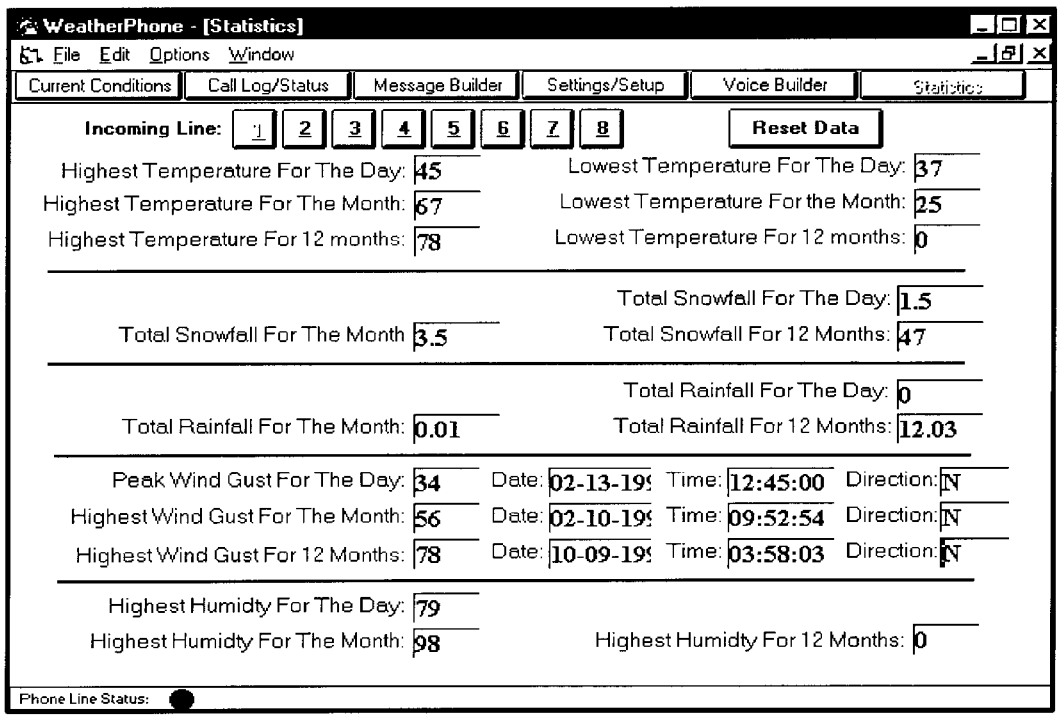
Figure 7Q:
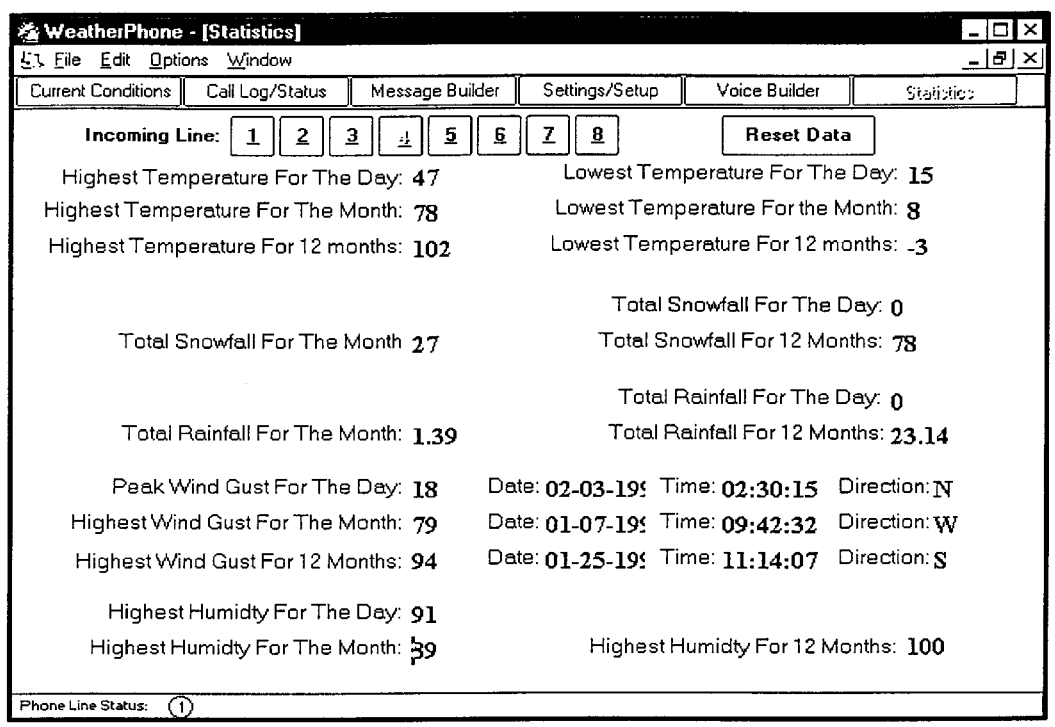

FIGS. 7A–7Q illustrate the display screen of station 102 as it would be seen by a WEATHERPHONE module manager. FIGS. 7A–B show the screen during the Current Conditions option. FIG. 7C shows the screen during the Call Log option. FIGS. 7D–K show the screen during various steps in the Message Builder option. FIGS. 7L–M show the screen during the Setup option. FIGS. 7N–O show the screen during the Voice Builder option. FIGS. 7P–Q show the screen during the Statistics option.

One advantage of having WEATHERPHONE module 7 access all data from a local database via an attached WEATHERCENTER module is that the most current available weather data may continue to be presented by WEATHERPHONE even if communications via network 3 with WEATHERSERVER 2 are interrupted for some reason. By separating the functions of accessing the remote database from responding to callers, the system according to the invention is able to reliably deliver and real-time multiparameter weather date from an unprecedented number of different locations.

A source code listing for an embodiment of the WEATHERPHONE module is attached as Appendix B.

WEATHERNET

FIG. 1 also shows a network presentation module 8, referred to herein as WEATHERNET. The WEATHERNET module enables users to access data in database 2 via a computer network connection. Module 8 also allows multiple users to access the weather data at the base computer via a computer client/server network interconnection. Using any one of a number of standard client/server network interfaces (such as HTTP, Compuserve, or any other network client/server protocol), network client users may specify from which of the remote stations they wish to receive weather data. The data including the real-time weather conditions at the selected site is presented to the users in a variety of formats that are supported by the particular client/server protocol being used. In a HTTP client/server setting, data is presented as text, graphical representations, satellite, radar, and photographic images, and may be presented as video or audio.

According to the present invention, the data accessible through WEATHERNET module 8 is accessed from the same WEATHERSERVER database as the data from modules 6 and 7. According to a specific embodiment, WEATHERNET module 8 is a UNIX-based program that has an interface component for connection with the WEATHERSERVER 2 that is different from the WEATHERCENTER module.

A source code listing for this module is attached as Appendix C.

The invention has now been explained with reference to specific embodiments. Many other embodiments and variations will be apparent to those of ordinary skill in the art upon reference to this specification. It will be obvious to one of skill in the art that many of the disclosed details of the devices and methods described herein can be varied without changing the essential nature of the invention. It is therefore not intended that this invention be limited, except as indicated by the appended claims.

What is claimed is:

1. A system for detecting weather conditions at multiple sites and reporting those conditions in real time via multiple interactive voice messages comprising:

a. multiple weather stations, each comprising:

(1) one or more weather instruments, each capable of sensing a particular weather parameter, and converting said sensed weather parameter into an analog electrical signal;

(2) converters for converting the analog signal from each said instrument into a series of digital electrical signals corresponding to the values of the sensed weather parameter over time;

b. one or more base computers programmed to
   (1) receive digital signals in real time encoding weather data collected at a particular weather station;
   (2) store and retrieve said digital signals to and from local data storage;
   (3) communicate weather data with a centralized server database;

c. a server database computer programmed to
   (1) receive digital data from said base computers in real-time encoding weather data collected at a particular weather station;
   (2) store and retrieve said digital signals to and from data storage;
   (3) transmit selected real-time weather data in response to requests received over a network;

d. a telephone driver unit for
   (1) retrieving real-time weather data for selected weather station sites from one of said base computer's local storage;
   (2) presenting voice menu options to a telephone user;
   (3) encoding said real-time data into voice messages and playing said voice message to callers in response to caller input.

2. The system of claim 1 further comprising:
a weather center software interface module running in each of said base computers for communicating data and requests to said database and for maintaining a local database containing real-time weather data.

3. The system of claim 2 wherein said software interface module is a windows-based program.

4. The system of claim 1 wherein said database stores multiparameter data from at least four different geographic locations.

5. The system of claim 1 wherein said telephone user may access multiparameter data from any one of at least four different geographic locations.

6. The system of claim 2 wherein said software interface module stores at said local database both data retrieved from said weather database and data from one or more attached weather stations.

7. The system of claim 1 further comprising:
e. a multimedia network computer programmed to
   (1) retrieve real-time weather data for selected weather station sites from said weather database and store that data locally;
   (2) present interactive menu options to a network user;
   (3) encode said real-time data into multimedia data for presentation to said network user.

8. A system for collecting real-time weather information from a plurality of sites and making said information available to a plurality of users in a plurality of different formats comprising:

a plurality of remote weather stations, each of said remote weather stations capable of collecting weather data from a plurality of weather-sensing devices and of communicating said weather data to a weather center module in real time;

a plurality of weather center module computers capable of communicating with said remote weather stations for receiving real-time weather data collected by said weather stations and capable of communicating with one or more presentation modules for presenting said weather data to a user, said weather center modules transmitting summary data, on a real-time basis to a remote weather server database for use by other weather center modules and capable of retrieving data from said weather server database for remote weather sites when requested by a presentation module;

a database server computer capable of receiving weather data from said base station computers and compiling said data into a real-time multisite multivariable database; and a presentation module computer capable of communicating with said database server through a weather center module and capable of presenting real-time data from said multisite multivariable real-time database in response to specific user requests as a series of voice messages.

9. The system according to claim 8 further comprising:
a television meteorologists' display driver capable of communicating with said database server computer and capable of presenting real-time data from said multisite multivariable real-time database during a television broadcast under the live control of a weather reporter.

10. The system according to claim 8 further comprising:
a network server capable of communicating with database computer and capable of presenting real-time data from said multisite multivariable real-time database to network clients via a network protocol.

11. A system for presenting real-time weather conditions from multiple sites to users via multiple interactive voice messages comprising:
a controller;
a local database of real-time weather data collected from automated weather stations, said stations located at at least two geographically separate sites; and
a telephone unit for:
   (1) presenting voice menu options to a telephone user;
   (2) retrieving real-time weather data from said local database in response to user input; and
   (3) encoding said real-time data into voice messages and playing said voice message to callers in response to caller input.

12. The system of claim 11 further comprising:
a network interface component for retrieving real-time weather data from a network weather server.

13. The system of claim 11 further comprising:
a weather station unit for controlling and retrieving data from an automatic weather detecting device.

14. The system of claim 11 further comprising:
a management unit for setting up system parameters.

15. A method for collecting and presenting weather data comprising collecting weather data at a plurality of remote weather station sites;

transferring said weather data to a plurality of station base computers capable of compiling, indexing, and storing said weather data into a multisite database;

sending weather data from said plurality of station base computers to a central real-time weather database computer capable of accepting said data;

accessing said station base computers with a plurality of independent presentation drivers, said drivers able to present weather data in a variety of different formats.

16. The method of claim 15 wherein said station base computers and said independent presentation drivers share a software interface module for communicating data to said central real-time weather database.

* * * * *